United States Patent
He et al.

(10) Patent No.: US 11,737,168 B2
(45) Date of Patent: Aug. 22, 2023

(54) OFFLOADING COMMUNICATION FUNCTIONS FROM A SLAVE USER EQUIPMENT TO A MASTER USER EQUIPMENT

(71) Applicant: QUALCOMM Incorporated, San Diego, CA (US)

(72) Inventors: Linhai He, San Diego, CA (US); Soo Bum Lee, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/060,973

(22) Filed: Oct. 1, 2020

(65) Prior Publication Data
US 2021/0105862 A1     Apr. 8, 2021

Related U.S. Application Data

(60) Provisional application No. 62/909,535, filed on Oct. 2, 2019.

(51) Int. Cl.
*H04W 84/20* (2009.01)
*H04W 76/14* (2018.01)
(Continued)

(52) U.S. Cl.
CPC ......... *H04W 84/20* (2013.01); *H04W 12/033* (2021.01); *H04W 12/069* (2021.01); *H04W 76/14* (2018.02)

(58) Field of Classification Search
CPC . H04W 84/20; H04W 12/033; H04W 12/069; H04W 76/14; H04W 92/18;
(Continued)

(56) References Cited

U.S. PATENT DOCUMENTS

2014/0204834 A1* 7/2014 Singh ............... H04W 36/03
                                                    370/315
2016/0302181 A1* 10/2016 Fujishiro .......... H04W 72/0406
(Continued)

FOREIGN PATENT DOCUMENTS

WO     2018031344 A2     2/2018

OTHER PUBLICATIONS

"3rd Generation Partnership Project; Technical Specification Group Services and System Aspects; Study on Architecture Enhancements to ProSe UE-to-Network Relay (Release 15)", 3GPP Standard, Technical Report, 3GPP TR 23.733, 3rd Generation Partnership Project (3GPP), Mobile Competence Centre, 650, Route Des Lucioles, F-06921 Sophia-Antipolis Cedex, France, vol. SA WG2. No. V15.1.0, Dec. 22, 2017 (Dec. 22, 2017), pp. 1-81, XP051392106, [retrieved on Dec. 22, 2017], p. 64-p. 67, figures 6.6.1.1.4-1.
(Continued)

*Primary Examiner* — Abdullahi Ahmed
(74) *Attorney, Agent, or Firm* — Muncy, Geissler, Olds & Lowe, P.C.

(57) ABSTRACT

In an aspect, a slave UE and a master UE each establish an attachment to a core network of a cellular communications system. The slave UE obtains security credentials configured to encrypt and decrypt traffic between the slave UE and the core network. A D2D connection is established between the slave UE and the master UE (e.g., tethering). One or more communication functions are offloaded from the slave UE to the master UE, including at least one communication function with the core network for maintaining the attachment of the slave UE to the core network. Application-layer data is relayed to/from the slave UE over the D2D connection. In an aspect, either the slave UE or the master UE may perform encryption and decryption of control plane signaling using the slave UE's security credentials.

30 Claims, 15 Drawing Sheets

(51) Int. Cl.
*H04W 12/033* (2021.01)
*H04W 12/069* (2021.01)

(58) Field of Classification Search
CPC ... H04W 28/08; H04W 88/04; H04W 12/037; H04W 4/70; H04W 4/02; G06F 9/44594
See application file for complete search history.

(56) References Cited

U.S. PATENT DOCUMENTS

| | | | |
|---|---|---|---|
| 2017/0013495 A1* | 1/2017 | Chae | H04W 52/0296 |
| 2018/0220350 A1* | 8/2018 | Ingale | H04W 4/80 |
| 2021/0153254 A1* | 5/2021 | Zhu | H04W 76/11 |
| 2021/0235266 A1* | 7/2021 | Starsinic | H04L 65/1073 |

OTHER PUBLICATIONS

Huawei, et al., "L2 UE Relay Technology Consideration for Wearable", 3GPP Draft, 3GPPTSG·RAN WG2Meeting #93bls, R2-162642, L2 Relay Technology Consideration for Wearable, 3rd Generation Partnership Project (3GPP), Mobile Competence Centre, 650, Route Des Lucioles, F-06921 Sophia-Antipolis Cedex, F, vol. RAN WG2, No. Dubrovnik, Croatia, Apr. 11, 2016-Apr. 15, 2016, Apr. 2, 2016 (Apr. 2, 2016)XP051082482, 4 pgs, Retrieved from the Internet: URL:http://www.3gpp.org/ftp/tsg_ran/WG2_RL2/TSGR2_93bis/Docs/,[retrieved on Apr. 2, 2016],p. 3, paragraph 2.4.
International Search Report and Written Opinion—PCT/US2020/053950—ISAEPO—dated Dec. 16, 2020.
Jung S., et al., "A New Way of Extending Network Coverage: Relay-Assisted D2D Communications in 3GPP", ICT Express, vol. 2, No. 3, Aug. 20, 2016 (Aug. 20, 2016), pp. 117-121, XP055436058, ISSN: 2405-9595, DOI: 10.1016/j.icte.2016.08.001, p. 4, figure 3.

* cited by examiner

OFFLOADING COMMUNICATION FUNCTIONS FROM A SLAVE USER EQUIPMENT TO A MASTER USER EQUIPMENT

CROSS-REFERENCE TO RELATED APPLICATION

The present Application for Patent claims the benefit of U.S. Provisional Application No. 62/909,535, entitled "OFFLOADING COMMUNICATION FUNCTIONS FROM A SLAVE USER EQUIPMENT TO A MASTER USER EQUIPMENT", filed Oct. 2, 2019, assigned to the assignee hereof and hereby expressly incorporated by reference herein in its entirety.

BACKGROUND OF THE DISCLOSURE

1. Field of the Disclosure

Aspects of the disclosure relate generally to wireless communications and to techniques and apparatuses for offloading one or more communication functions from a slave user equipment (UE) to a master UE.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some designs, a user equipment (UE) (e.g., an NR-Light or RedCap UE, such as a wearable device, or any type of UE with low available processing capacity and/or a low battery condition) may become tethered to another UE (e.g., a smartphone). In such arrangements, the tethered UE may be characterized as a slave UE, and the UE to which the slave UE is tethered may be characterized as a master UE. The tethering may be implemented via a device-to-device (D2D) connection, which may alternatively be referred to as a personal area network (PAN) connection (e.g., via Bluetooth, LTE-D, WiFi-Direct, etc.). Many legacy slave UEs were required to be tethered to a master UE so as to obtain cellular network connectivity via the master UE. However, it is now becoming commonplace for slave UEs to be equipped with their own cellular modem to permit cellular connectivity even when the slave UEs are untethered (e.g., a user can leave his/her smartphone at home while going on a run with a smartwatch that provides cellular connectivity even when untethered from the smartphone, etc.). Hence, slave UEs may connect to application servers to obtain various services in a variety of ways.

Given the higher distances involved, cellular communications generally consume more power than tethered D2D communications. Accordingly, offloading some cellular-related communication functions from the slave UE to the master UE while tethered may result in power savings at the slave UE.

In an aspect of the disclosure, a method, a computer-readable medium, and an apparatus are provided. The apparatus may be a slave UE. The slave UE establishes an attachment to a core network of a cellular communications system, and obtains a set of security credentials configured to encrypt and decrypt traffic between the slave UE and the core network. The slave UE establishes a D2D connection with a master UE that is also attached to the core network. The slave UE offloads, from the slave UE to the master UE, one or more communication functions including at least one communication function with the core network for maintaining the attachment of the slave UE to the core network, the one or more offloaded communication functions including transport of control plane signaling associated with the slave UE's set of security credentials. The slave UE exchanges application-layer data that is relayed by the master UE over the D2D connection and is targeted to or received from an application server.

In an aspect of the disclosure, a method, a computer-readable medium, and an apparatus are provided. The apparatus may be a master UE. The master UE establishes an attachment to a core network of a cellular communications system. The master UE establishes a D2D connection with a slave UE that is also attached to the core network. The master UE offloads, from the slave UE to the master UE, one or more communication functions including at least one communication function with the core network for maintaining the attachment of the slave UE to the core network. The master UE performs the one or more offloaded communication functions on behalf of the slave UE, the one or more offloaded communication functions including transport of control plane signaling associated with a set of security credentials assigned to the slave UE. The master UE relays application-layer data between an application server and the slave UE via the D2D connection.

Aspects generally include a method, apparatus, system, computer program product, non-transitory computer-readable medium, user equipment, cIoT user equipment, base station, wireless communication device, and/or processing system as substantially described with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
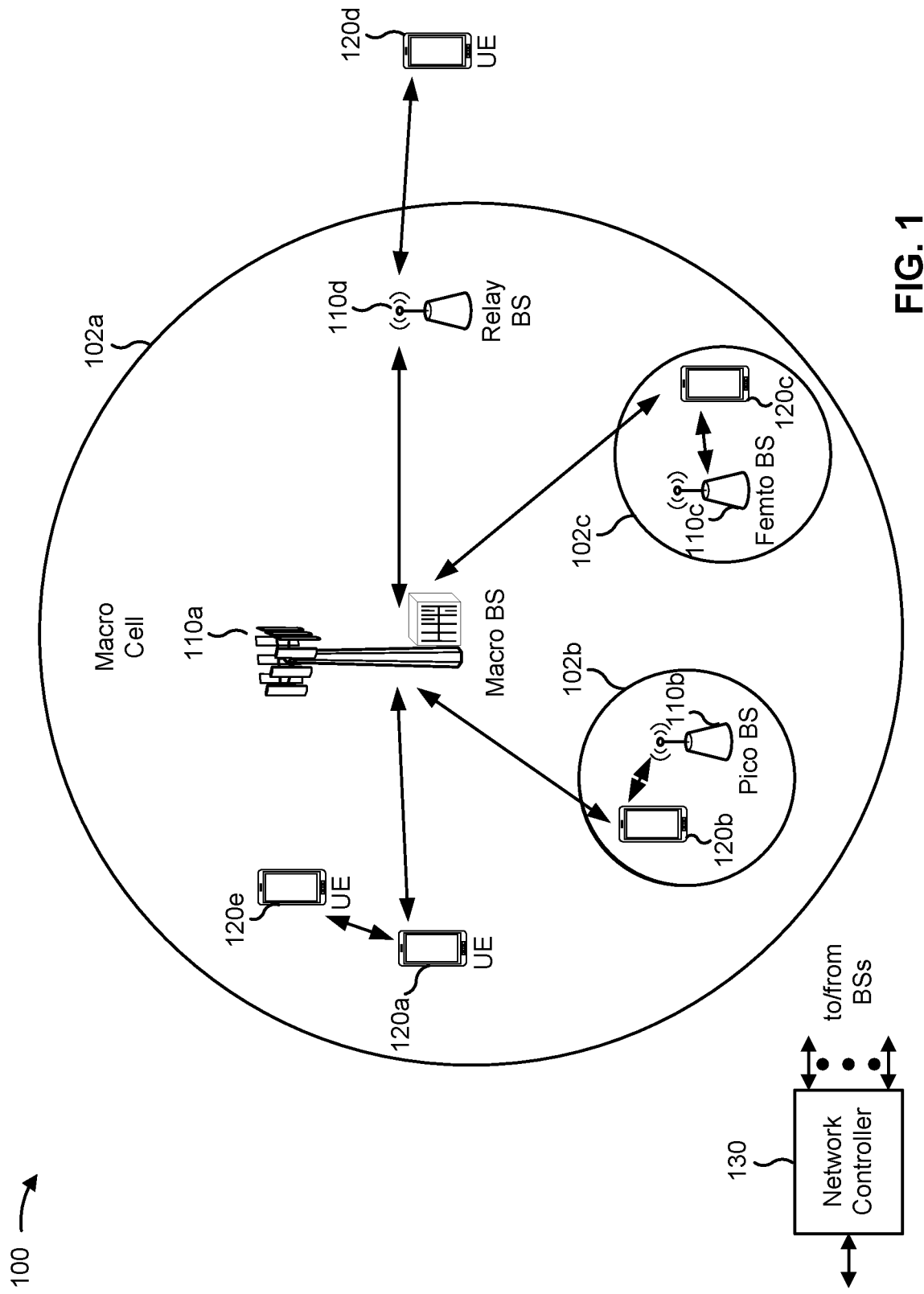
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
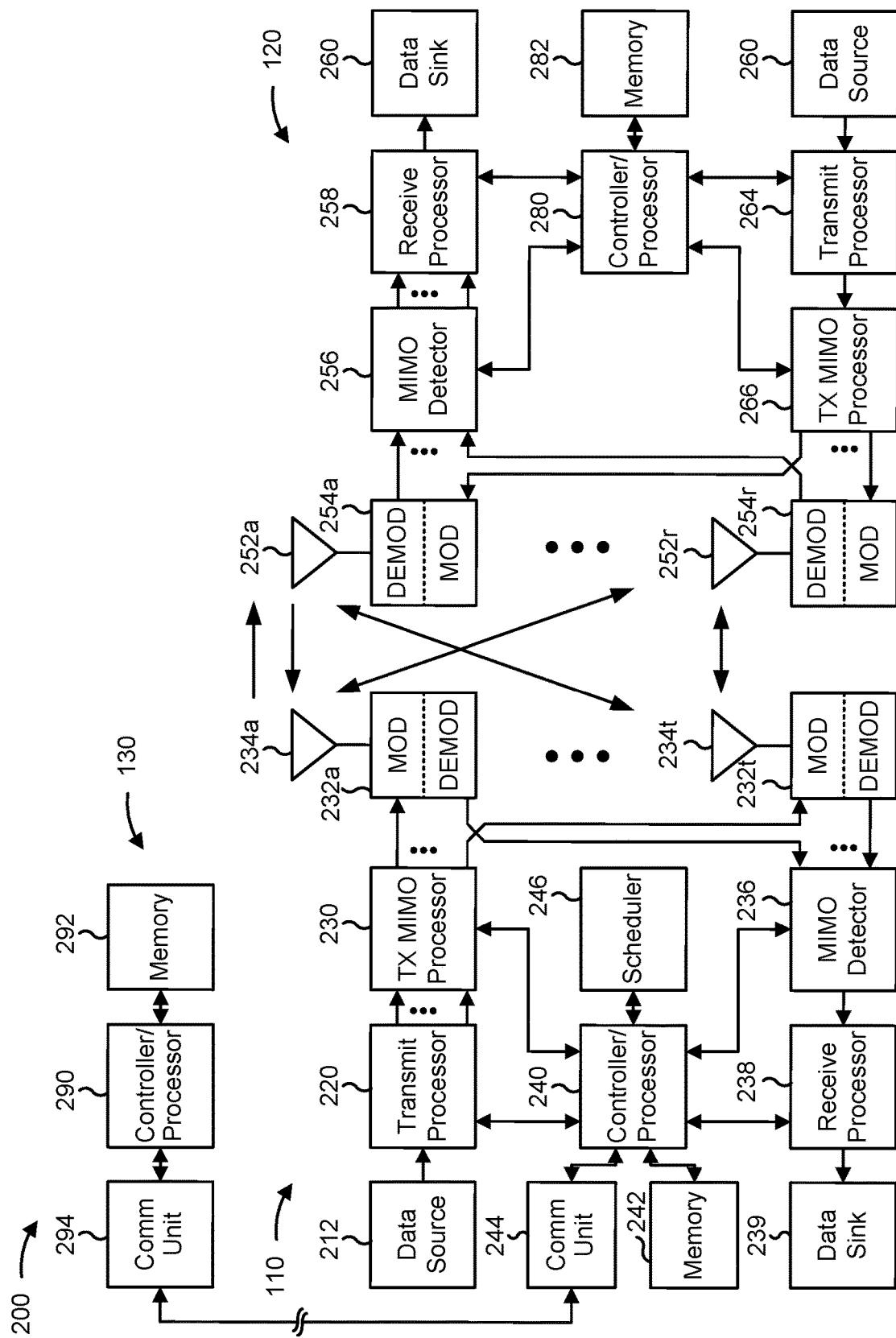
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

As noted above, various device types may be characterized as UEs. Starting in 3GPP Rel. 17, a number of these UE types are being allocated a new UE classification denoted as "NR-Light" UEs or reduced capability ("RedCap") UEs. Examples of UE types that fall under the RedCap classification include wearable devices (e.g., smart watches, etc.), industrial sensors, video cameras (e.g., surveillance cameras, etc.), and so on. Generally, the UE types grouped under the RedCap classification are associated with lower communicative capacity. For example, relative to 'normal' UEs (e.g., UEs not classified as RedCap), RedCap UEs may be limited in terms of maximum bandwidth (e.g., 5 MHz, 10 MHz, 20 MHz, etc.) for transmission and/or reception, maximum transmission power (e.g., 20 dBm, 14 dBm, etc.), number of receive antennas (e.g., 1 receive antenna, 2 receive antennas, etc.), and so on. Some RedCap UEs may also be sensitive in terms of power consumption (e.g., requiring a long battery life, such as several years) and may be highly mobile. Moreover, in some designs, it is generally desirable for RedCap UEs to co-exist with UEs implementing protocols such as eMBB, URLLC, LTE NB-IoT/MTC, and so on. In one particular example, industrial IoT (I-IOT) wireless sensors may be associated with intensive uplink traffic, moderate reliability and latency (e.g., non-URLLC), small packet size with a relatively long TX interval (e.g., low data rate), and high capacity (e.g., up to 1 UE per square meter).

In some designs, a UE (e.g., an NR-Light or RedCap UE, such as a wearable device) may become tethered to another UE (e.g., a smartphone). In such arrangements, the tethered UE may be characterized as a slave UE, and the UE to which the slave UE is tethered may be characterized as a master UE. The tethering may be implemented via a device-to-device (D2D) connection, which may alternatively be referred to as a personal area network (PAN) connection (e.g., via Bluetooth, LTE-D, WiFi-Direct, etc.). Many legacy slave UEs were required to be tethered to a master UE so as to obtain cellular network connectivity via the master UE. However, it is now becoming commonplace for slave UEs to be equipped with their own cellular modem to permit cellular connectivity even when the slave UEs are untethered (e.g., a user can leave his/her smartphone at home while going on a run with a smartwatch that provides cellular connectivity even when untethered from the smartphone, etc.).

Hence, slave UEs may connect to application servers to obtain various services in a variety of ways. Some slave UEs may function as (mostly) independent devices that use their own respective cellular modems to obtain cellular connectivity (even when tethered). In such designs, the application server is effectively the master device, and a slave UE and master UE may each exchange data with the application server on their own. In such designs, it is the job of the application server to ensure that states and data on the slave UE and the master UE are consistent and synchronized. In this case, tethering is implemented between the slave UE and its master UE at the transport layer. In other designs, a slave UE may be a permanent accessory of a master UE. In this case, all data exchanged by the slave UE is mediated via the master UE. The master UE controls and may filter data between the slave UE and the application server. In such designs, the slave UE may not be visible to the application server.

Figure 3:
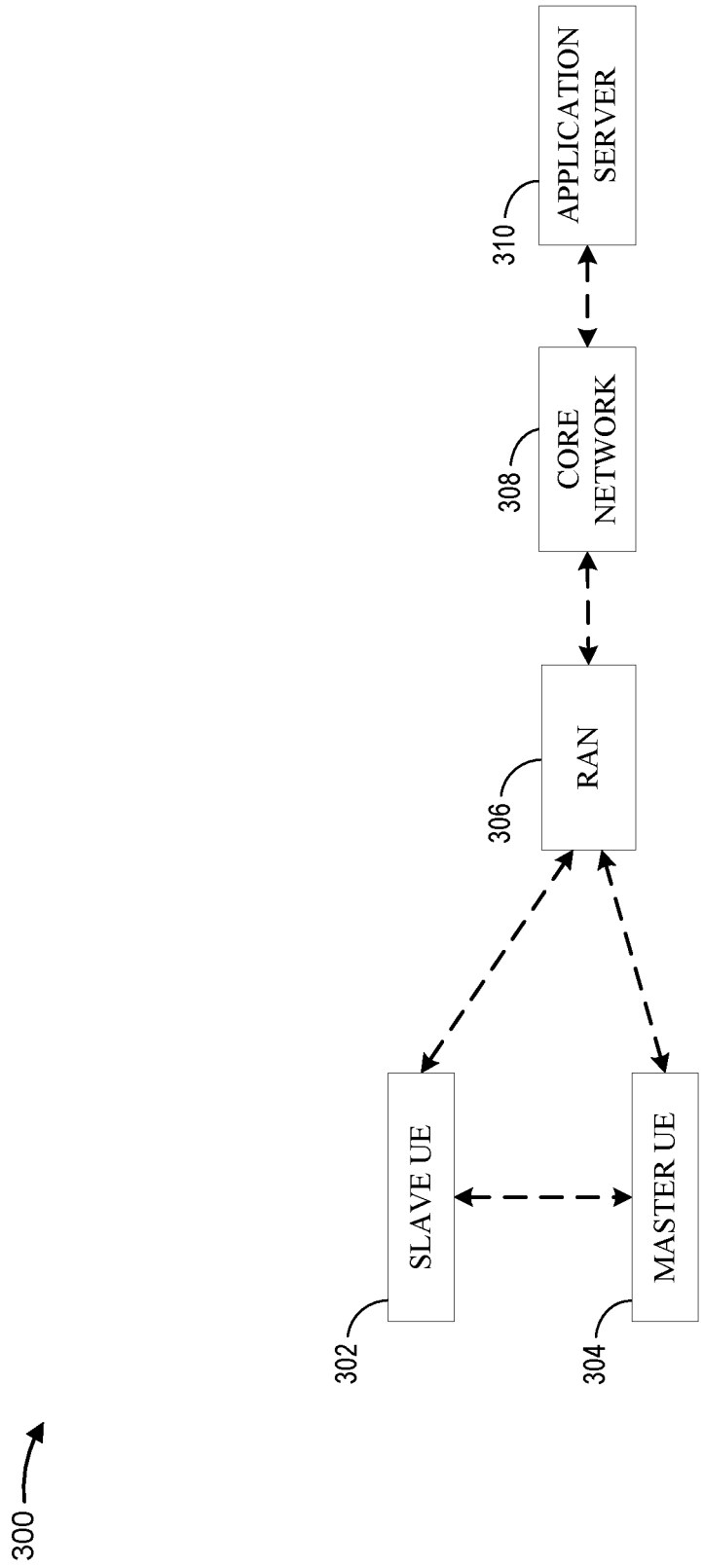
FIG. 3 illustrates a communications system in accordance with an embodiment of the disclosure.

FIG. 3 illustrates a communications system 300 in accordance with an embodiment of the disclosure. Referring to FIG. 3, a slave UE 302 is configured to be tethered to a master UE 304. However, at any particular point in time, the slave UE 302 may be in either a tethered state or an untethered state. The slave UE 302 and the master UE 304 are each equipped with components that permit a cellular connection to a radio access network (RAN) 306. In an example, the RAN 306 may comprise any of base stations 110 of FIGS. 1-2, and each of the slave UE 302 and the master UE may correspond to an instance of any of the UEs 120 of FIGS. 1-2. In some designs, the slave UE 302 may correspond to an NR-Light or RedCap UE, such as a wearable device. However, the slave UE 302 may more generally correspond to any type of UE, as the technical advantages associated with aspects of the disclosure (e.g., reduction to power consumption, freeing up processing capacity, etc.) are not limited to application with respect to NR-Light or RedCap UEs. The RAN 306 is communicatively coupled to a core network 308 via a backhaul connection. The RAN 306 and the core network 308 may collectively be referred to as a cellular communications system. The core network 308 is communicatively coupled to an application server 310 (e.g., via a communications interface such as an Internet connection). The application server 310 may provide any of a variety of services (e.g., video streaming, audio streaming, social networking services, etc.).

To maintain an attachment between the slave UE 302 and the core network 308, certain communication functions are required to be performed by the slave UE 302. Such communication functions comprise generation, processing, encryption and decryption of control plane signaling using a set of security credentials assigned to the slave UE 302 in association with the attachment, or generation, processing and transport of data plane signaling (e.g., application-layer traffic, which may flow between the slave UE 302 and the application server 310).

Embodiments of the disclosure are directed to offloading, from a slave UE to a master UE, at least some communication functions for maintaining an attachment of the slave UE to a core network. In some designs, the offloading occurs in response to a D2D connection being established between the slave UE and the master UE (i.e., tethering). The offloading may result in various technical advantages, such as reduced power consumption and system resource utilization. In some designs, the slave UE may correspond to an NR-Light or RedCap UE, while in other designs the slave UE may correspond to any type of UE (e.g., any UE for which reduced power consumption and/or reduced processing load is desired, such as a UE with higher processing power but experiencing a low battery condition, or a UE with a high processing load that seeks to reduce the processing load somewhat, etc.).

Figure 4:
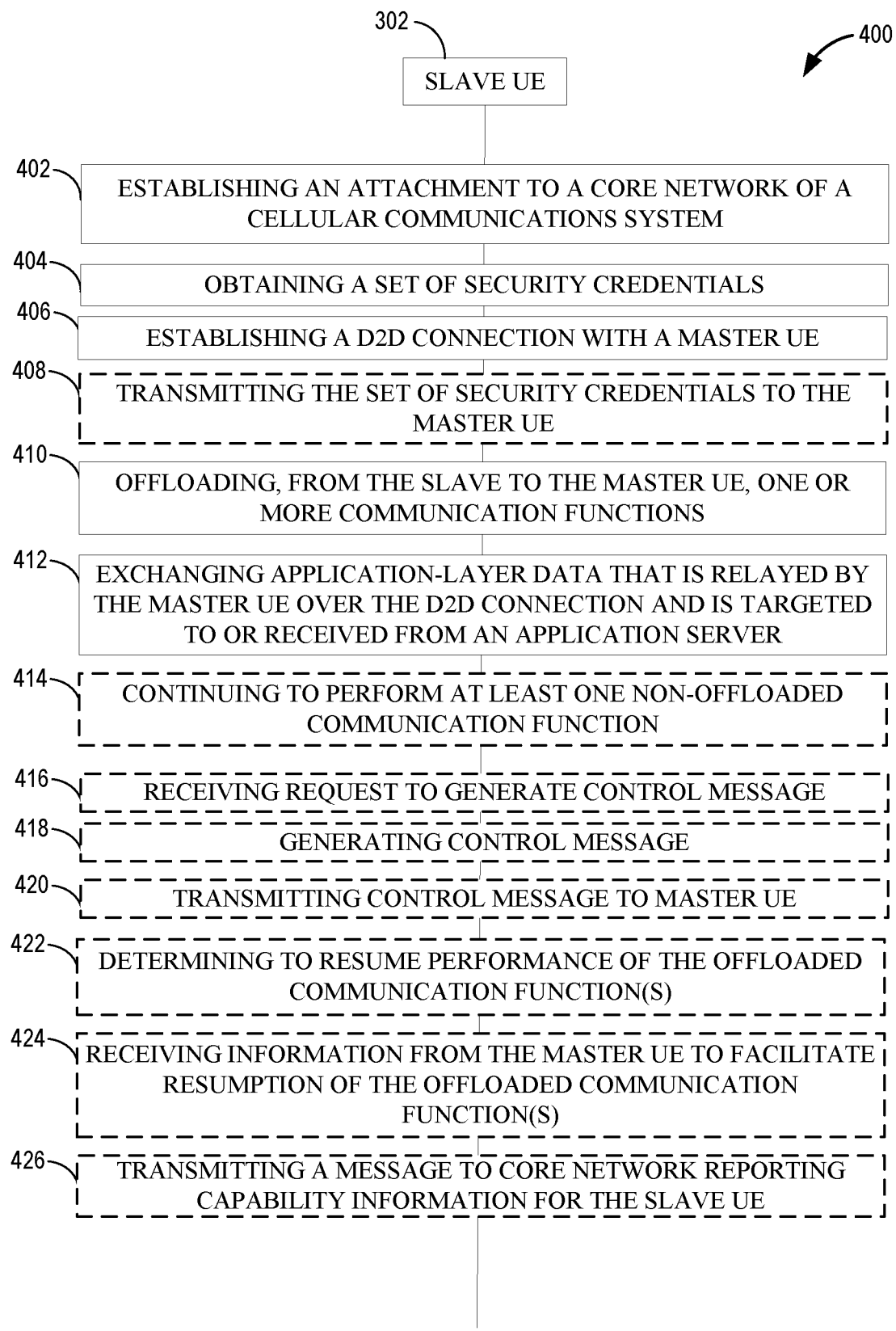
FIG. 4 illustrates an exemplary process of wireless communications according to an aspect of the disclosure.

FIG. 4 illustrates an exemplary process 400 of wireless communications according to an aspect of the disclosure. The process 400 of FIG. 4 is performed by slave UE 302, which may correspond to an example implementation of UE 120.

At 402, the slave UE 302 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) establishes an attachment to a core network of a cellular communications system. In an example, the attachment of 402 may be mediated via an exchange of messages mediated by the RAN 306. The attachment of 402 may be implemented via a cellular communications interface (e.g., cellular modem, etc.) of the slave UE 302.

At 404, the slave UE 302 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) obtains a set of security credentials. In an example, the set of security credentials may be obtained as a result of the attachment procedure of 402. For example, the attachment of 402 may comprise a security exchange procedure (e.g., Attach Request, Authentication Request, Authentication Response, Security Command Request, Security Command Complete, etc.). After the security exchange procedure is complete, the slave UE 302 has the requisite security credentials for encrypting and decrypting control plane signal exchanged between the slave UE and the core network 308. For example, the control plane signaling may comprise non-access stratum (NAS)/access stratum (AS) signaling.

At 406, the slave UE 302 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) establishes a device-to-device (D2D) connection (e.g., a PAN link) with a master UE 304 that is also attached to the core network 308. In some designs, the D2D connection is established via a communications protocol (e.g., Bluetooth, LTE-D, WiFi-Direct, etc.) that uses less power than a cellular communications protocol used for direct wireless communication between either the slave UE 302 or the master UE 304 and the RAN 306.

At 408, the slave UE 302 (e.g., controller/processor 280, antenna(s) 252a . . . 252r, TX MIMO processor 266, modulators(s) 254a . . . 254r, TX processor 264) optionally transmits the set of security credentials obtained at 404 to the master UE 304. In an example, the optional transmission of 408 may occur over the D2D connection established at 406. In an example, the optional transmission of 408 may be implemented to facilitate the master UE 304 to perform generation, processing, encryption and decryption of control plane signaling using the slave UE's 302 set of security credentials without involvement of the slave UE 302. In an alternative example, the optional transmission of 408 can be omitted. In this case, the slave UE 302 may be responsible for performing generation, processing, encryption and decryption of control plane signaling using the slave UE's 302 set of security credentials even while tethered to the master UE 304.

At 410, the slave UE 302 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) offloads, from the slave UE 302 to the master UE 304, one or more communication functions including at least one communication function with the core network 308 for maintaining the attachment of the slave UE 302 to the core network 308, the one or more offloaded communication functions including transport of control plane signaling associated with the slave UE's set of security credentials (e.g., so as to maintain the slave UE's 302 attachment with the core network). In some designs, the one or more offloaded communication functions may also comprise functions that are not expressly required to maintain the attachment of the slave UE 302 to the core network 308. As noted above with respect to 408, in addition to the transport of control plane signaling associated with the slave UE's set of security credentials, the slave UE 302 may (optionally) also offload generation, processing, encryption and decryption of control plane signaling using the slave UE's 302 set of security credentials without involvement of the slave UE 302. The offloading of 410 may be facilitated via a messaging exchange (e.g., setup/registration information) between the slave UE 302 and the master UE 304 over the D2D connection. In some designs, the offloaded communication function(s) may comprise a page monitoring function and transmission of mobile-originated service requests. In some designs, when the slave UE 302 is actively communicating data traffic with the cellular network, the offloaded communication function(s) may comprise a relay function whereby the master UE 304 exchanges application-layer data traffic with the access network 306 on the physical layer on behalf of the slave UE 302, and then relays this application-layer data traffic with the slave UE 302 via the D2D connection. In some designs, the offloaded communication function(s) may comprise radio resource management (RRM) and mobility management.

At 412, the slave UE 302 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) exchanges application-layer data that is relayed by the master UE 304 over the D2D connection and is targeted to or received from an application server 310. The application-layer data (or data plane traffic) may include mobile-originated (MO) data, mobile-terminated (MT) data, or a combination thereof. In some designs, the application-layer data may be exchanged at 412 with the tethering between the slave UE 302 and the master UE 304 remaining transparent to the application server 310.

At 414, the slave UE 302 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) optionally continues to perform at least one non-offloaded communication function (e.g., including one or more functions that are required to maintain the attachment of the slave UE to the core network) after the offloading of 410. In some designs, the at least one non-offloaded communication function may comprise performing generation, processing, encryption and decryption of control plane signaling (e.g., NAS/AS signaling, such as control plane registration messages, TAU messages, etc.) using the slave UE's 302 set of security credentials (e.g., if optional transmission of 408 is not performed). In such cases, control plane signaling is relayed to/from the slave UE 302 via the master UE 304 over the D2D connection. The non-offloaded communication function(s) may further comprise generation and processing of data plane traffic. For example, the data plane traffic may be relayed to/from the master UE 304 via the D2D connection, which uses less power than a wireless connection to the RAN 306. The control plane signaling may be relayed to/from the master UE 304 in a similar manner in some designs.

At 416, the slave UE 302 (e.g., controller/processor 280, antenna(s) 252a . . . 252r, demodulators(s) 254a . . . 254r, MIMO detector 256, RX processor 258) optionally receives a request to generate a control message (e.g., control plane signaling). The request of 416 may be received over the D2D connection. In an example, the request received at 416 is optional because generation, processing, encryption and decryption of control plane signaling may alternatively be offloaded to the master UE 304, in which case the master UE 304 would generate the control message itself without involvement of the slave UE 302. In an example, the control message may correspond to a control plane registration update message or a tracking area update (TAU) message.

At 418, the slave UE 302 (e.g., controller/processor 280) optionally generates the control message in response to the request of 416. In an example, the control message is generated (e.g., encrypted) based on the slave UE's 302 set of security credentials obtained at 404. As noted above, the generation of 418 is optional because generation, processing, encryption and decryption of control plane signaling may alternatively be offloaded to the master UE 304, in which case the master UE 304 would generate the control message itself without involvement of the slave UE 302.

At 420, the slave UE 302 (e.g., controller/processor 280, antenna(s) 252a . . . 252r, TX MIMO processor 266, modulators(s) 254a . . . 254r, TX processor 264) optionally transmits the control message to the master UE 304. The transmission of 420 may occur over the D2D connection. As noted above, the transmission of 420 is optional because generation, processing, encryption and decryption of control plane signaling may alternatively be offloaded to the master UE 304, in which case the master UE 304 would generate the control message itself without involvement of the slave UE 302.

At 422, the slave UE 302 (e.g., controller/processor 280) optionally determines to resume performance of the offloaded communication function(s) from 410. In some designs, the optional determination of 422 may occur in response to a link quality associated with the D2D connection dropping below a threshold. In some designs, the optional determination of 422 may occur in response to a teardown (e.g., untethering) of the D2D connection.

At 424, the slave UE 302 (e.g., controller/processor 280, antenna(s) 252a . . . 252r, demodulators(s) 254a . . . 254r, MIMO detector 256, RX processor 258) optionally receives information from the master UE 304 over the D2D connection to facilitate the resumption of the one or more offloaded communication functions. For example, the information received at 424 may comprise system information, measurements, uplink and downlink timing, etc. so that the slave UE 302 need not re-collect such information. In some designs, the slave UE 302 and the master UE 304 may have different supported bandwidth and/or other capabilities (e.g., because slave UE 302 may be NR-Light or RedCap UE, or any type of UE with low available processing capacity and/or a low battery condition), which may result in different applicable system parameters or measurements. In such cases, offsets (e.g., either configured by the network or defined in 3GPP specification) can be applied.

At 426, the slave UE 302 (e.g., controller/processor 280, antenna(s) 252a . . . 252r, TX MIMO processor 266, modulators(s) 254a . . . 254r, TX processor 264) optionally transmits a message reporting UE capability information for the slave UE 302 to the core network 308. For example, the slave UE 302 and the master UE 304 may have different capabilities as noted above. As part of the offloading of 410, the slave UE 426 may receive an indication of capability information for the master UE 304, and then transmit a message reporting the capability information for the master UE 304 as capability information for the slave UE 302. Hence, after the offloading of 410, the slave UE 302 may benefit from the enhanced capability of the master UE 304. In this case, the optional transmission of 426 may be performed to downgrade cellular performance to a level that can be supported by the slave UE 302 using its own cellular communication hardware (e.g., cellular modem, etc.).

Figure 5:
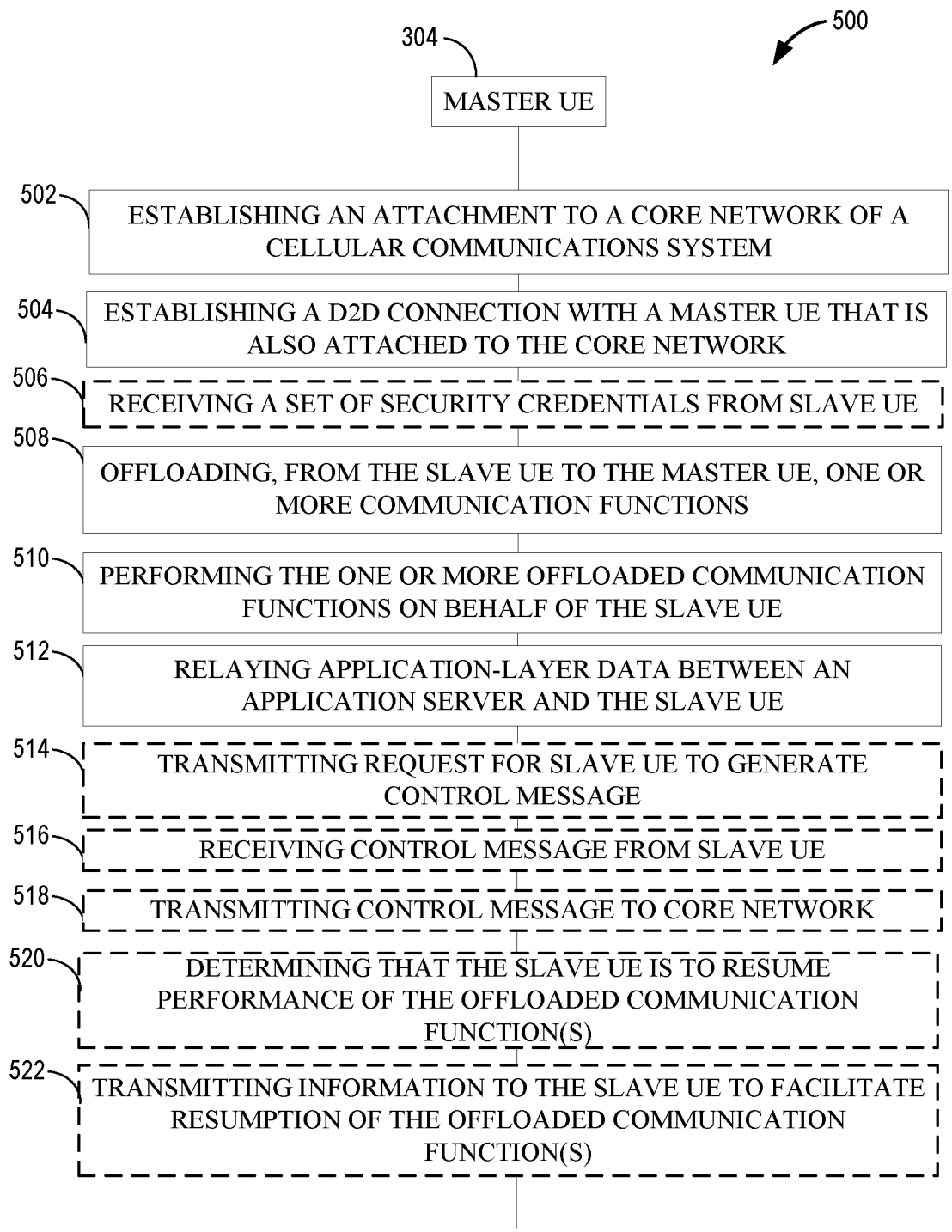
FIG. 5 illustrates an exemplary process of wireless communications according to another aspect of the disclosure.

FIG. 5 illustrates an exemplary process 500 of wireless communications according to another aspect of the disclosure. The process 500 of FIG. 5 is performed by master UE 304, which may correspond to an example implementation of UE 120.

At 502, the master UE 304 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) establishes an attachment to a core network of a cellular communications system. In an example, the attachment of 502 may be mediated via an exchange of messages mediated by the RAN 306. The attachment of 502 may be implemented via a cellular communications interface (e.g., cellular modem, etc.) of the master UE 304.

At 504, the master UE 304 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) establishes a device-to-device (D2D) connection (e.g., a PAN link) with the slave UE 302 that is also attached to the core network 308. In some designs, the D2D connection is established via a communications protocol (e.g., Bluetooth, LTE-D, WiFi-Direct, etc.) that uses less power than a cellular communications protocol used for direct wireless communication between either the slave UE 302 or the master UE 304 and the RAN 306.

At 506, the master UE 304 (e.g., controller/processor 280, antenna(s) 252a . . . 252r, TX MIMO processor 266, modulators(s) 254a . . . 254r, TX processor 264) optionally receives a set of security credentials obtained assigned to the slave UE 302. In an example, the optional reception of 506 may occur over the D2D connection established at 504. In an example, the optional reception of 506 may be implemented to facilitate the master UE 304 to perform generation, processing, encryption and decryption of control plane signaling using the slave UE's 302 set of security credentials without involvement of the slave UE 302. In an alternative example, the optional reception of 506 can be omitted. In this case, the slave UE 302 may be responsible for performing generation, processing, encryption and decryption of control plane signaling using the slave UE's 302 set of security credentials even while tethered to the master UE 304.

At 508, the master UE 304 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) offloads, from the slave UE 302 to the master UE 304, one or more communication functions including at least one communication function with the core network 308 for maintaining the attachment of the slave UE 302 to the core network 308. The offloading of 508 may be facilitated via a messaging exchange (e.g., setup/registration information) between the slave UE 302 and the master UE 304 over the D2D connection. In some designs, the offloaded communication function(s) may comprise a page monitoring function and transmission of mobile-originated service requests. In some designs, when the slave UE 302 is actively communicating data traffic with the cellular network, the offloaded communication function(s) may comprise a relay function whereby the master UE 304 exchanges application-layer data traffic with the access network 306 on the physical layer on behalf of the slave UE 302, and then relays this application-layer data traffic with the slave UE 302 via the D2D connection. In some designs, the offloaded communication function(s) may comprise radio resource management (RRM) and mobility management.

At 510, the master UE 304 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) performs the one or more offloaded communication functions on behalf of the slave UE, the one or more offloaded communication functions including transport of control plane signaling associated with a set of security credentials assigned to the slave UE (e.g., so as to maintain the slave UE's 302 attachment with the core network). As noted above with respect to 506, in addition to the transport of control plane signaling associated with the slave UE's set of security credentials, the master UE 304 may (optionally) also offload generation, processing, encryption and decryption of control plane signaling using the slave UE's 302 set of security credentials without involvement of the slave UE 302. In some designs, the offloaded communication function(s) may comprise a page monitoring function and transmission of mobile-originated service requests.

At 512, the master UE 304 (e.g., controller/processor 280, antenna(s) 252a . . . 252r, demodulators(s) 254a . . . 254r, MIMO detector 256, RX processor 258, TX MIMO processor 266, modulators(s) 254a . . . 254r, TX processor 264) relays application-layer data between the application server 310 and the slave UE 302 via the D2D connection. The application-layer data (or data plane traffic) may include mobile-originated (MO) data, mobile-terminated (MT) data, or a combination thereof. In some designs, the application-layer data may be exchanged at 512 with the tethering between the slave UE 302 and the master UE 304 remaining transparent to the application server 310.

At 514, the master UE 304 (e.g., controller/processor 280, antenna(s) 252a . . . 252r, TX MIMO processor 266, modulators(s) 254a . . . 254r, TX processor 264) optionally transmits a request to generate a control message (e.g., control plane signaling) to the slave UE 302. The request of 514 may be transmitted over the D2D connection. In an example, the request transmission at 514 is optional because generation, processing, encryption and decryption of control plane signaling may alternatively be offloaded to the master UE 304, in which case the master UE 304 would generate the control message itself without involvement of the slave UE 302. In an example, the control message may correspond to a control plane registration update message or a tracking area update (TAU) message.

At 516, the master UE 304 (e.g., controller/processor 280, antenna(s) 252a . . . 252r, demodulators(s) 254a . . . 254r, MIMO detector 256, RX processor 258) optionally receives the control message from the slave UE 302. The optional reception of 516 may occur over the D2D connection. As noted above, the reception of 516 is optional because generation, processing, encryption and decryption of control plane signaling may alternatively be offloaded to the master UE 304, in which case the master UE 304 would generate the control message itself without involvement of the slave UE 302.

At 518, the master UE 304 (e.g., controller/processor 280, antenna(s) 252a . . . 252r, TX MIMO processor 266, modulators(s) 254a . . . 254r, TX processor 264) optionally transmits the control message (e.g., control plane signaling) to the core network 308. As noted above, the control message may correspond to a control plane registration update message or a tracking area update (TAU) message (e.g., NAS/AS signaling).

At 520, the master UE 304 (e.g., controller/processor 280) optionally determines that the slave UE 302 is to resume performance of the offloaded communication function(s) from 508. In some designs, the optional determination of 520 may occur in response to a link quality associated with the D2D connection dropping below a threshold. In some designs, the optional determination of 520 may occur in response to a teardown (e.g., untethering) of the D2D connection.

At 522, the master UE 304 (e.g., controller/processor 280, antenna(s) 252a . . . 252r, demodulators(s) 254a . . . 254r, MIMO detector 256, RX processor 258) optionally transmits information to the slave UE 302 over the D2D connection to facilitate the resumption of the one or more offloaded communication functions. For example, the information transmitted at 522 may comprise system information, measurements, uplink and downlink timing, etc. so that the slave UE 302 need not re-collect such information. In some designs, the slave UE 302 and the master UE 304 may have different supported bandwidth and/or other capabilities (e.g., because slave UE 302 may be NR-Light or RedCap UE, or any type of UE with low available processing capacity and/or a low battery condition), which may result in different applicable system parameters or measurements. In such cases, offsets (e.g., either configured by the network or defined in 3GPP specification) can be applied.

Figure 6:
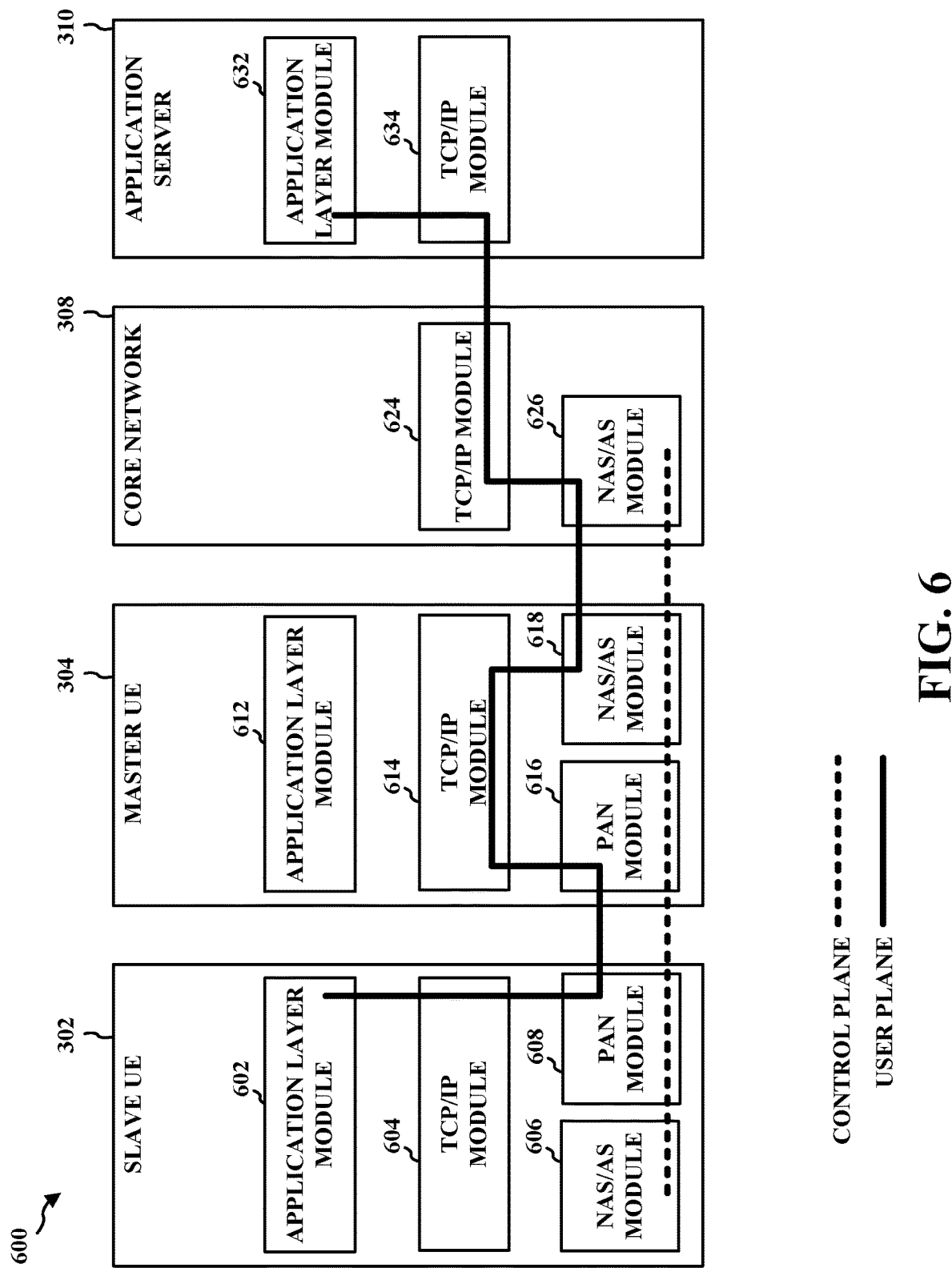
FIG. 6 illustrates example communicative pathways (e.g., a control plane signaling pathway and a user plane (or data plane) traffic pathway) of the communications system of FIG. 3 in accordance with an embodiment of the disclosure.

FIG. 6 illustrates example communicative pathways 600 (e.g., a control plane signaling pathway and a user plane (or data plane) traffic pathway) of the communications system 300 in accordance with an embodiment of the disclosure. In particular, the control plane signaling pathway and a user plane (or data plane) traffic pathway are examples of such pathways that are implemented after the offloading of 410 of FIG. 4 or 508 of FIG. 5 while the slave UE 302 is D2D-connected (or tethered) to the master UE 304.

Referring to FIG. 6, the modules relevant to control plane signaling and user plane (or data plane) traffic are depicted. Other modules may also be present, but are omitted for the sake of clarity. The RAN 306 is also not depicted in FIG. 6, but is understood to be present in both the control plane signaling pathway and a user plane (or data plane) traffic pathway.

In FIG. 6, the slave UE 302 comprises an application-layer module 602, a TCP/IP module 604, a NAS/AS module 606 and a PAN module 608. The master UE 304 similarly comprises an application-layer module 612, a TCP/IP module 614, a PAN module 616, and a NAS/AS module 618. The core network 308 comprises a TCP/IP module 624 and a NAS/AS module 626. The application server 310 comprises an application-layer module 632 and a TCP/IP module 634.

Referring to FIG. 6, the user plane (or data plane) traffic pathway (in forward or reverse order) comprises the application-layer module 602, the TCP/IP module 604, the PAN module 608, the PAN module 616, the TCP/IP module 614, the NAS/AS module 618, the NAS/AS module 626, the TCP/IP module 624, the TCP/IP module 634 and the application-layer module 632. The control plane signaling pathway comprises the NAS/AS module 606, the PAN module 608, the PAN module 616, the NAS/AS module 618, and the NAS/AS module 626.

In the configuration of FIG. 6, the control plane signaling pathway is specific to the scenario where 408 of FIGS. 4 and 506 of FIG. 5 are not performed, such that the slave UE 302 continues to perform generation, processing, encryption and decryption of control plane signaling using the slave UE's 302 set of security credentials while tethered to the master UE 304. For example, the slave UE 302 generates TAU messages, and transmits the TAU messages to the master UE 304 over the D2D connection. The master UE 304 then encapsulates the TAU messages into the master UE's 304 own NAS message, which is then transported to the core network 308. The master UE 304 monitors paging occasions for paging messages (which are not encrypted) targeted to the slave UE 302. If there is MT data for the slave UE 302, the slave UE 302 performs Service Request via a tunnel through the master UE 304 (e.g., Service Request generated/ encrypted at the slave UE 302 and sent to the master UE 304 for NAS encapsulation/transmission to the core network 308). MO data can be handled in a similar manner (on a reverse path). In this implementation, a Packet Data Convergence Protocol (PDCP) identity of the slave UE 302 remains on the slave UE 302, while the slave UE's 302 radio link control (RLC) and medium access control (MAC) entities are transferred to the master UE 304. In this case, the tethering between the slave UE 302 and the master UE 304 will be transparent to both the core network 308 and the application server 310. The communicative pathways 600 of FIG. 6 are described below in more detail with respect to FIGS. 7-9.

Figure 7:
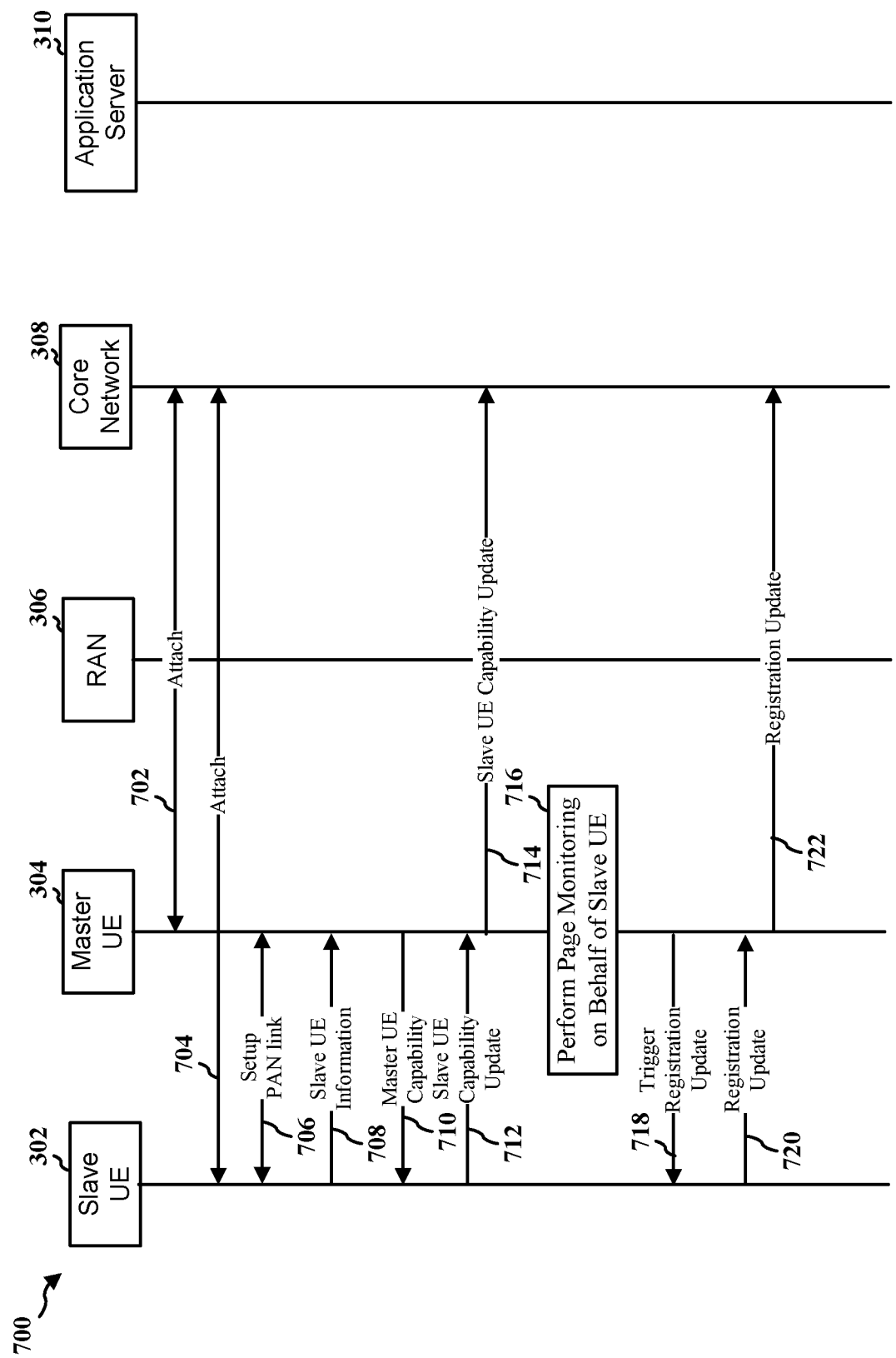
FIG. 7 illustrates an example implementation of the processes of FIGS. 4-5 in accordance with an embodiment of the disclosure.

FIG. 7 illustrates an example implementation 700 of the processes 400-500 of FIGS. 4-5 in accordance with an embodiment of the disclosure.

Referring to FIG. 7, at 702, the master UE 304 performs an initial attach procedure with the core network 308. At 704, the slave UE 302 performs an initial attach procedure with the core network 308. At 706, the slave UE 302 and master UE 304 establish a PAN link (e.g., a D2D connection) therebetween. At 708, the slave UE 302 transmits information related to the slave UE's cellular connection to the master UE 304, such as the slave UE's 302 UE ID, paging occasions, etc. At 710, the master UE 304 transmits its UE capability information to the slave UE 302. At 712, the slave UE 302 uses its security credentials to generate, encrypt and transmit a UE capability update message (which references the master UE's 304 capabilities) to the master UE 304. At 714, the master UE 304 encapsulates the UE capability update message in its own NAS message and transmits the encapsulated UE capability update message (which references the master UE's 304 capabilities) to the core network 308.

Referring to FIG. 7, at 716, the master UE 304 performs page monitoring on behalf of the slave UE 302 in all RRC states (the slave UE 302 ceases page monitoring at this point). In some designs, the master UE 304 informs the slave UE 302 when there is a change in tracking area (e.g., in some implementations, the slave UE 302 and the master UE 304 may be associated with the same tracking area). At 718 (e.g., in response to a change in a tracking area associated with the slave UE 302), the master UE 304 requests that the slave UE 302 generate a Registration Update message. At 720, the slave UE 302 uses its security credentials to generate, encrypt and transmit the Registration Update message to the master UE 304. At 722, the master UE 304 encapsulates the Registration Update message in its own NAS message and transmits the encapsulated Registration Update message to the core network 308.

Figure 8:
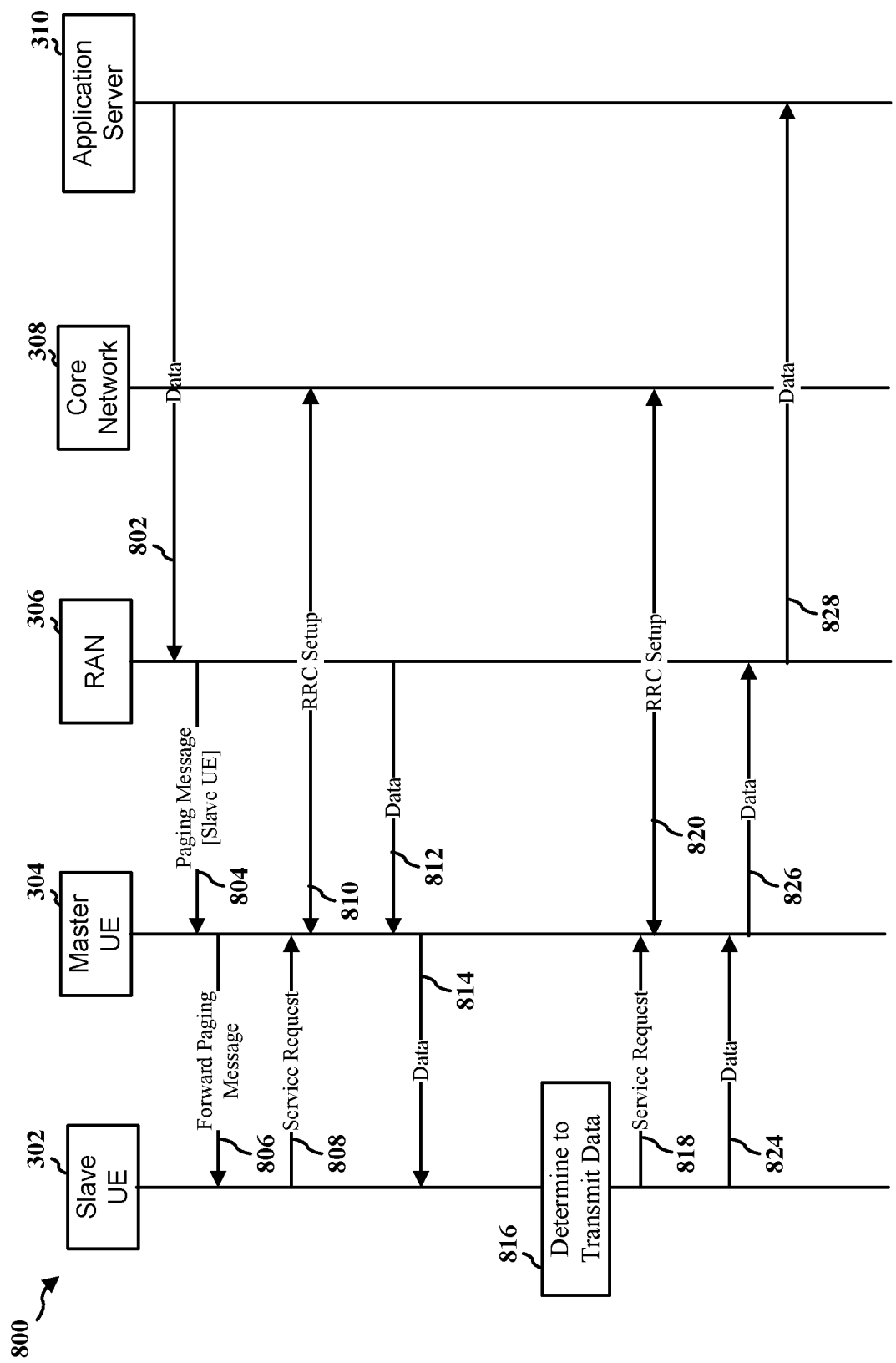
FIG. 8 illustrates an example implementation of the processes of FIGS. 4-5 in accordance with another embodiment of the disclosure.

FIG. 8 illustrates an example implementation 800 of the processes 400-500 of FIGS. 4-5 in accordance with another embodiment of the disclosure. In particular, the process 800 of FIG. 8 is a continuation of the process 700 of FIG. 7.

Referring to FIG. 8, at 802, the application server 310 transmits MT data to the RAN 306 for transmission to the slave UE 302. At 804, assuming that the master UE 304 is RRC idle/inactive, the RAN 306 transmits a paging message targeted to the slave UE 302 which is received at the master UE 304 by virtue of the offloaded page monitoring function. At 806, the master UE 304 forwards the paging message to the slave UE 302 over the PAN link. At 808, the slave UE 302 slave uses its security credentials to generate, encrypt and transmit a Service Request message to the master UE 304. At 810, the master UE 304 encapsulates the Service Update message in its own NAS message and transmits the encapsulated Service Update message to the core network 308 so as to perform RRC setup. At 812, the MT data is transmitted by the RAN 306 and received at the master UE 304. At 814, the MT data is transmitted by the master UE 304 to the slave UE 302 over the PAN link. In an alternative example, if the master UE 304 is not RRC idle/inactive when the MT data is received at 802, then 804-810 can be omitted and the RAN 306 can proceed directly to 812.

At some later point in time, the slave UE 302 determines to transmit data (MO data) back to the application server 310. At 816, assuming that the master UE 304 is RRC idle/inactive, the slave UE 302 uses its security credentials to generate, encrypt and transmit a Service Request message to the master UE 304. At 820, the master UE 304 encapsulates the Service Update message in its own NAS message and transmits the encapsulated Service Update message to the core network 308 so as to perform RRC setup. At 824, the MO data is transmitted by the slave UE 302 to the master UE 304 over the PAN link. At 826, the MO data is transmitted by the master UE 304 to the RAN 306. At 828, the MO data is forwarded by the RAN 306 to the application server 310. In an alternative example, if the master UE 304 is not RRC idle/inactive at 816, then 818-820 can be omitted and the slave UE 302 can proceed directly to 824.

As shown in FIG. 8, the master UE 304 may perform a mobility procedure (e.g., RRC setup and data transmission/reception over the RAN 306 on behalf of the slave UE 302). Further, when the master UE 304 is in RRC-Connected mode, random access channel (RACH) and data transmission in PHY/MAC/RLC layers do not require the slave UE's 302 set of security credentials for encryption/decryption. Hence, these aspects can be made part of the offloaded communication function(s) handled by the master UE 304 while the slave UE 302 is tethered thereto. In particular, the master UE 304 can perform various procedures at PHY/MAC/RLC layers so as to send/receive PDCP PDUs on behalf of the slave UE 302 (e.g., although, the slave UE 302 may continue to run its own PDCP).

Figure 9:
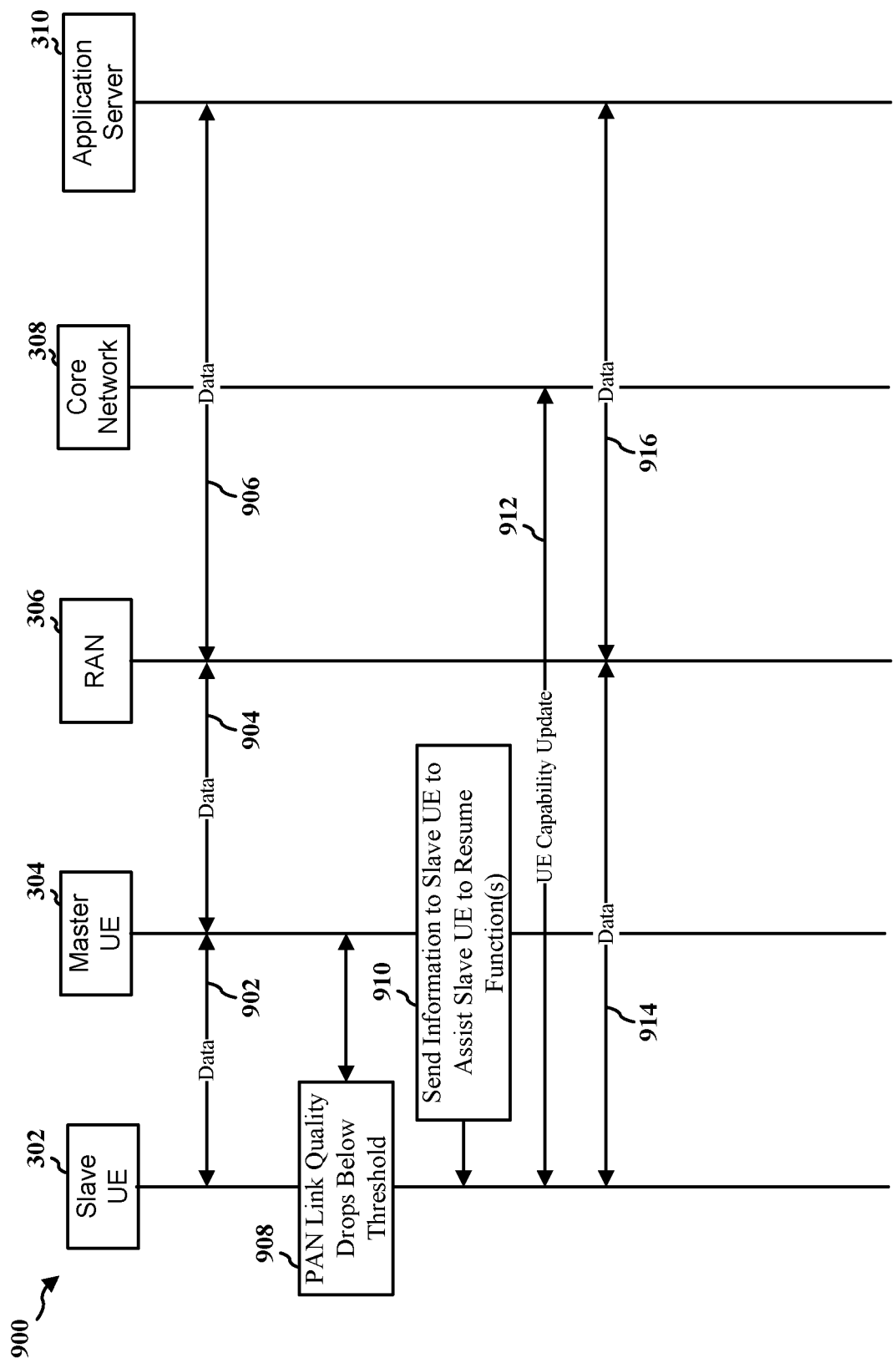
FIG. 9 illustrates an example implementation of the processes of FIGS. 4-5 in accordance with another embodiment of the disclosure.

FIG. 9 illustrates an example implementation 900 of the processes 400-500 of FIGS. 4-5 in accordance with another embodiment of the disclosure. In particular, the process 900 of FIG. 9 is a continuation of the process 800 of FIG. 8.

Referring to FIG. 9, at 902-906, the various components 302-310 transport MT and MO data as described above with respect to FIG. 8. At 908, the slave UE 302 detects that the PAN link quality has dropped below a threshold. In some designs, the determination of 908 can be made at the master UE 304 instead, and then reported to the slave UE 302. At 910, the master UE 304 transmits, to the slave UE 302 over the PAN link, information (e.g., system information, measurements, uplink and downlink timing, etc.) to assist the slave UE 302 to resume the offloaded communication function(s) (e.g., so that the slave UE 302 need not re-collect such information). At 912, the slave UE 302 uses its security credentials to generate, encrypt and transmit a UE capability update message (which references the slave UE's 302 capabilities) to the core network 308. At 914-916, the slave UE 302 begins to directly communicate with the application server 310 (i.e., without involvement or mediation by the master UE 304).

Referring to FIG. 9, the master UE 304 may perform RRM and mobility procedures on behalf of the slave UE 302 such that the slave UE 302 need not know which cell or RAT is connected to the master UE 304.

Figure 10:
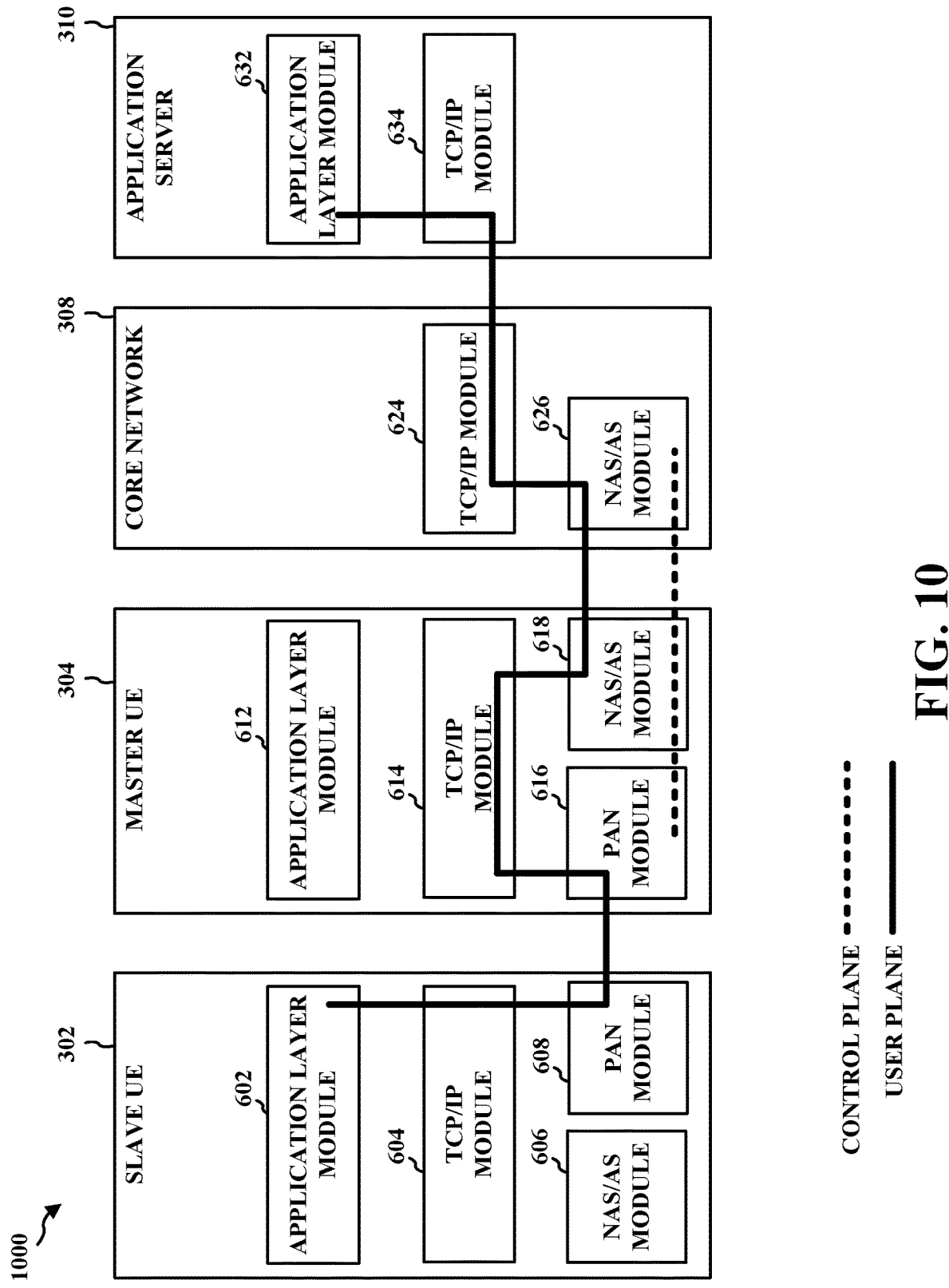
FIG. 10 illustrates example communicative pathways (e.g., a control plane signaling pathway and a user plane (or data plane) traffic pathway) of the communications system of FIG. 3 in accordance with another embodiment of the disclosure.

FIG. 10 illustrates example communicative pathways 1000 (e.g., a control plane signaling pathway and a user plane (or data plane) traffic pathway) of the communications system 300 in accordance with another embodiment of the disclosure. In particular, the control plane signaling pathway and a user plane (or data plane) traffic pathway are examples of such pathways that are implemented after the offloading of 410 of FIG. 4 or 508 of FIG. 5 while the slave UE 302 is D2D-connected (or tethered) to the master UE 304. The modules of components 302-310 in FIG. 10 are the same as discussed above with respect to FIG. 6, and as such will not be described again for the sake of brevity.

Referring to FIG. 10, the user plane (or data plane) traffic pathway (in forward or reverse order) is the same as discussed above with respect to FIG. 6. However, unlike FIG. 6, the control plane signaling pathway is specific to the scenario where 408 of FIGS. 4 and 506 of FIG. 5 are performed, such that the slave UE 302 offloads performance of generation, processing, encryption and decryption of control plane signaling using the slave UE's 302 set of security credentials while tethered to the master UE 304. To put another way, in an example, the master UE 304 is able to run the entire NAS/AS protocol stack on behalf of the slave UE 302. In this case, the control plane signaling between the slave UE 302 and the master UE 304 over the D2D connection (or PAN link) as illustrated in FIG. 6 is effectively eliminated (e.g., across air interface, the master UE 304 functions like a dual subscriber identity module (SIM) dual standby (DSDA) phone, with the slave UE 302 as one of its SIMs).

Accordingly, the control plane signaling pathway in FIG. 10 comprises the PAN module 616, the NAS/AS module 618, and the NAS/AS module 626. As will be described below in more detail, the master UE 304 can perform the generation, processing, encryption and decryption of control plane signaling using the slave UE's 302 set of security credentials without involvement of the slave UE 302. The communicative pathways 1000 of FIG. 10 are described below in more detail with respect to FIGS. 11-12.

Figure 11:
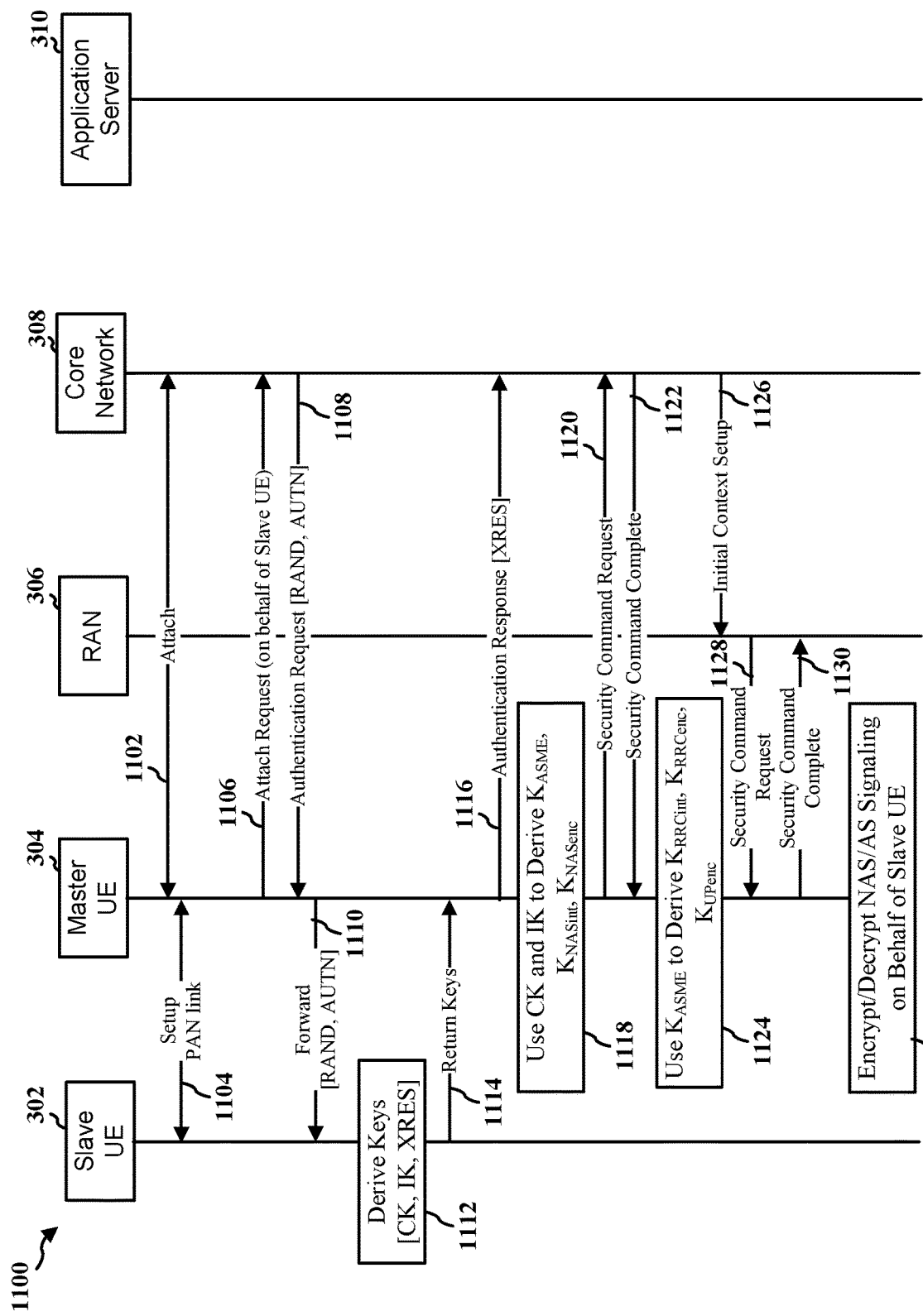
FIG. 11 illustrates an example implementation of the processes of FIGS. 4-5 in accordance with another embodiment of the disclosure.

FIG. 11 illustrates an example implementation 1100 of the processes 400-500 of FIGS. 4-5 in accordance with another embodiment of the disclosure. In FIG. 11, the slave UE 302 offloads all NAS/AS signaling to the master UE 304, such that the master UE 304 runs a virtual SIM of the slave UE 302.

Referring to FIG. 11, at 1102, the master UE 304 performs an initial attach procedure with the core network 308. At 1104, the slave UE 302 and master UE 304 establish a PAN link (e.g., a D2D connection) therebetween. A modified initial attachment of the slave UE 302 to the core network 308 will now be discussed in more detail.

Referring to FIG. 11, at 1106, the master UE 304 transmits an Attach Request to the core network 308 on behalf of the slave UE 302 (e.g., effectively pretending to be the slave UE 302). At 1108, the core network 308 responds to the Attach Request from 1106 with an Authentication Request [RAND, AUTN]. At 1110, the master UE 304 forwards [RAND, AUTN] to the slave UE 302. At 1112, the slave UE 302 derives security keys [CK, IK, XRES]. At 1114, the slave UE 302 returns the derived security keys [CK, IK, XRES] to the master UE 304. At 1116, the master UE 304 transmits an Authentication Response [XRES] to the core network 308. At 1118, the master UE 304 uses CK and IK to derive $K_{ASME}$, $K_{NASint}$ and $K_{NASenc}$. At 1120, the master UE 304 transmits a Security Command Request to the core network 308. At 1122, the core network 308 responds to the Security Command Request with a Security Command Complete message. At 1124, the master UE 304 uses $K_{ASME}$ to derive $K_{RRCint}$, $K_{RRCenc}$ and $K_{UPenc}$. At 1126, the core network 308 transmits an Initial Context Setup message to the RAN 306. At 1128, the RAN 306 transmits Security Command Request to the master UE 304. At 1130, the master UE 304 responds to the Security Command Request with a Security Command Complete message. At 1132, the master UE 304 can now encrypt/decrypt NAS/AS signaling on behalf of the slave UE 302 without any further involvement by the slave UE 302.

Figure 12:
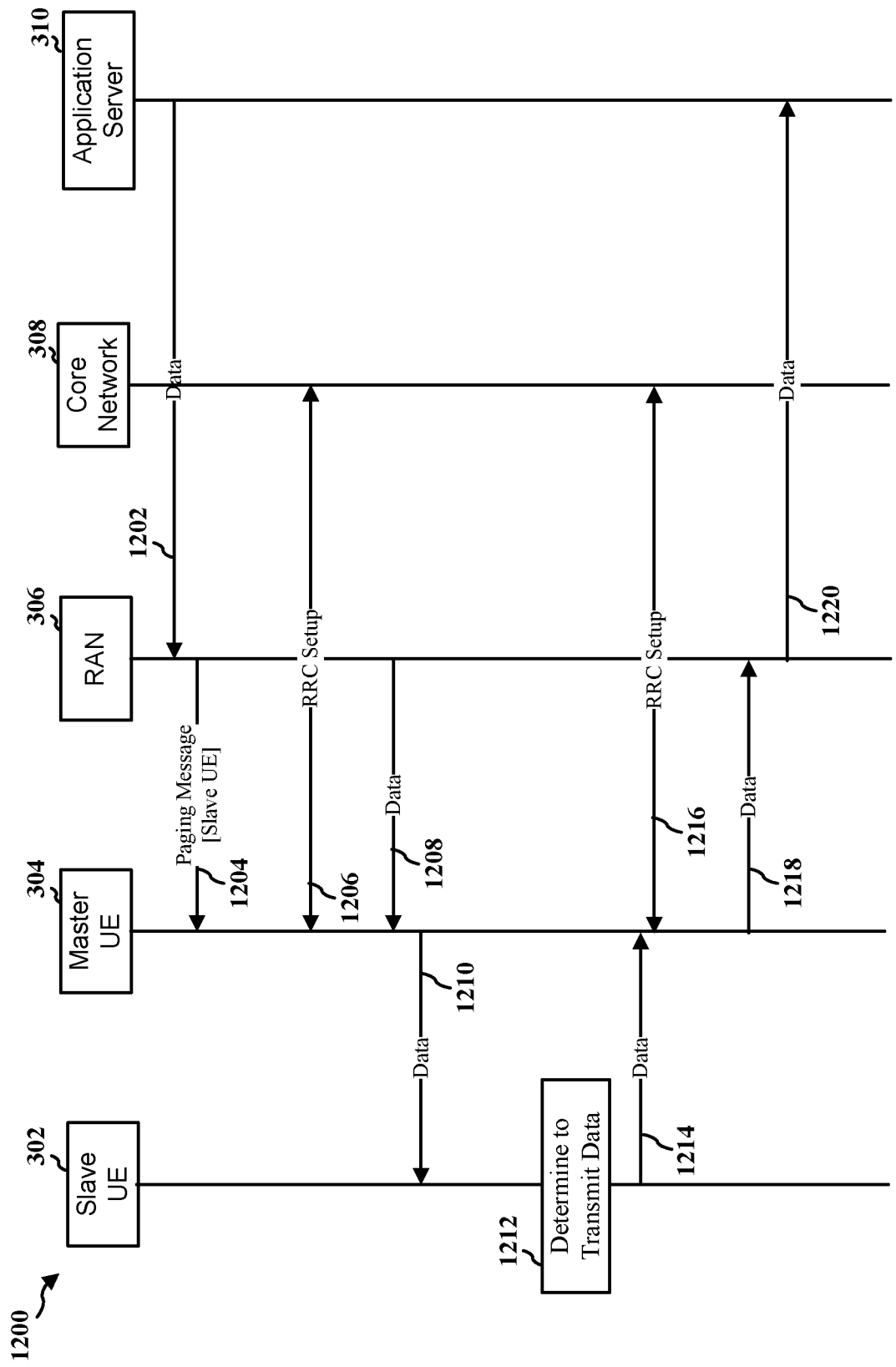
FIG. 12 illustrates an example implementation of the processes of FIGS. 4-5 in accordance with another embodiment of the disclosure.

FIG. 12 illustrates an example implementation 1200 of the processes 400-500 of FIGS. 4-5 in accordance with another embodiment of the disclosure. In particular, the process 1200 of FIG. 8 is a continuation of the process 1100 of FIG. 11. The process 1200 of FIG. 12 is similar in some respects to the process 800 of FIG. 8. However, unlike the process 800 of FIG. 8, the slave UE 302 is bypassed altogether with respect to control plane signaling, which is instead handled entirely by the master UE 304. To put another way, in FIG. 12, the slave UE 302 offloads all NAS/AS signaling to the master UE 304, such that the master UE 304 runs a virtual SIM of the slave UE 302 (e.g., the master UE 304 performs functions similar to DSDC operation, whereby the PDCP entity of the slave UE 302 is located in the master UE 304).

Referring to FIG. 12, at 1202, the application server 310 transmits MT data to the RAN 306 for transmission to the slave UE 302. At 1204, assuming that the master UE 304 is RRC idle/inactive, the RAN 306 transmits a paging message targeted to the slave UE 302 (e.g., in the slave UE's 302 own paging occasions) which is received at the master UE 304 by virtue of the offloaded page monitoring function (e.g., the master UE 304 monitors the slave UE's 302 paging occasions). At 1206, the master UE 304 uses the slave UE's 302 security credentials obtained via the process 1100 of FIG. 11 to generate, encrypt and transmit a Service Request message to the core network 308 as part of an RRC setup procedure. After RRC setup, at 1208, the MT data is transmitted by the RAN 306 and received at the master UE 304. At 1210, the MT data is transmitted by the master UE 304 to the slave UE 302 over the PAN link. Accordingly, 806-808 of FIG. 8 are omitted in the process 1200 of FIG. 12. Moreover, in an alternative example, if the master UE 304 is not RRC idle/inactive when the MT data is received at 1202, then 1204-1206 can be omitted and the RAN 306 can proceed directly to 1208.

At some later point in time, the slave UE 302 determines to transmit data (MO data) back to the application server 310. At 1214, the MT data is transmitted by the slave UE 302 to the master UE 304 over the PAN link (without the slave UE 302 factoring an RRC state of the master UE 304). At 1216, assuming that the master UE 304 is RRC idle/inactive, the master UE 304 uses the slave UE's 302 security credentials obtained via the process 1100 of FIG. 11 to generate, encrypt and transmit a Service Request message to the core network 308 as part of an RRC setup procedure. After RRC setup, at 1218, the MO data is transmitted by the master UE 304 to the RAN 306. At 1220, the MO data is forwarded by the RAN 306 to the application server 310. Accordingly, 818-820 of FIG. 8 are omitted in the process 1200 of FIG. 12. Moreover, in an alternative example, if the master UE 304 is not RRC idle/inactive at 1212, then 1216 can be omitted and the master UE 304 can proceed directly to 1218.

Figure 13:
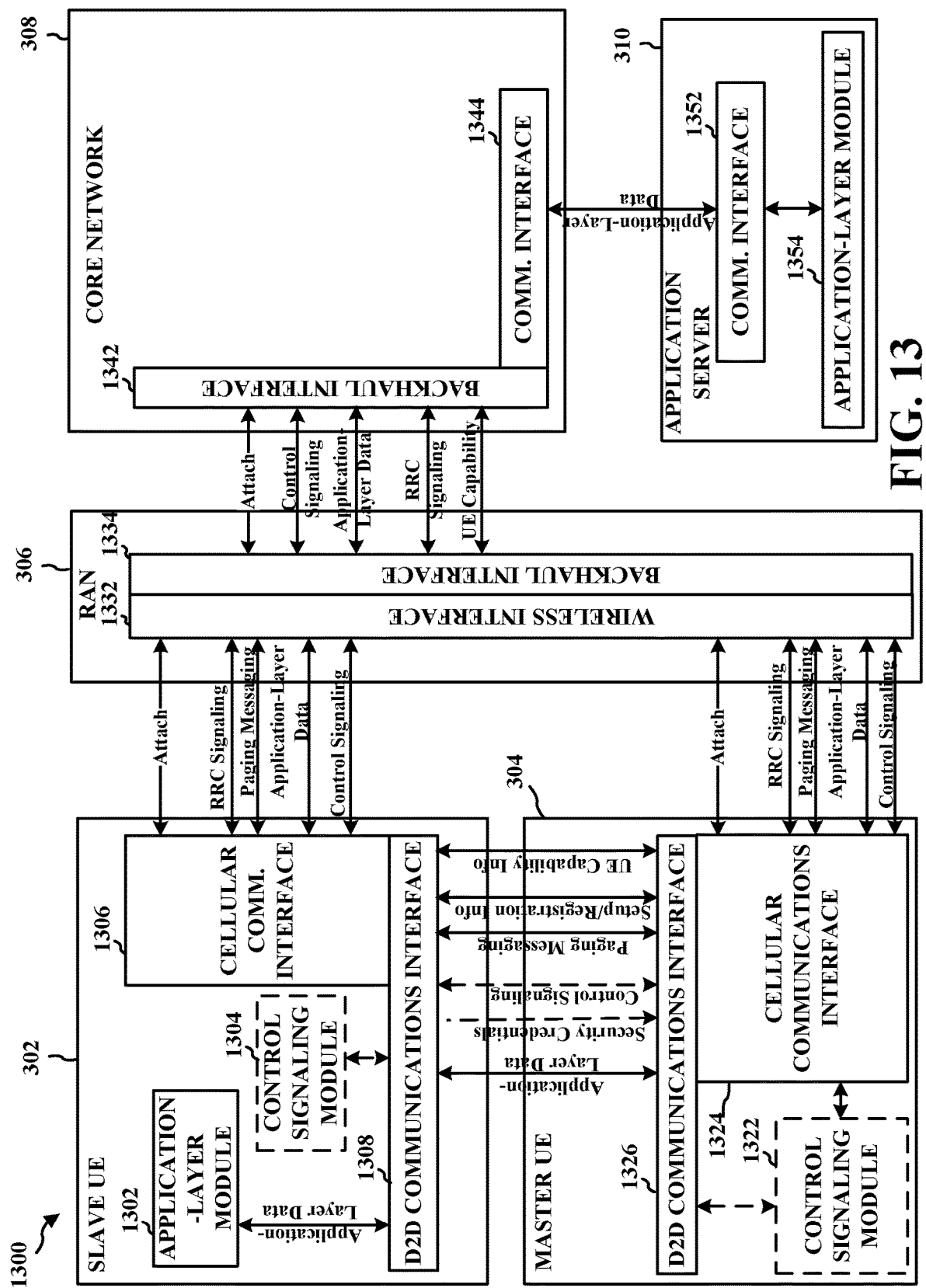
FIG. 13 is a conceptual data flow diagram illustrating data flow between different means/components according to an aspect of the disclosure.

FIG. 13 is a conceptual data flow diagram 1300 illustrating the data flow between different means/components in exemplary apparatuses 302-310 in accordance with an embodiment of the disclosure.

The slave UE 302 includes an application-layer module 1302, which may correspond to processor circuitry in UE 120 as depicted in FIG. 2, including controller/processor 280 and memory 282. The slave UE 302 further optionally includes a control signaling module 1304, which may correspond to processor circuitry in UE 120 as depicted in FIG. 2, including controller/processor 280 and memory 282. The slave UE 302 further includes a cellular communications interface 1306 (e.g., 5G NR, etc.), which may comprise transmitter and receiver circuitry in UE 120 as depicted in FIG. 2, including controller/processor 280, antenna(s) 252a . . . 252r, modulators(s) 254a . . . 254r, TX MIMO processor 266, TX processor 264, demodulators(s) 254a . . . 254r, MIMO detector 256, RX processor, etc. The slave UE 302 further includes a D2D communications interface 1308 (e.g., Bluetooth, etc.), which may comprise transmitter and receiver circuitry in UE 120 as depicted in FIG. 2, including controller/processor 280, antenna(s) 252a . . . 252r, modulators(s) 254a . . . 254r, TX MIMO processor 266, TX processor 264, demodulators(s) 254a . . . 254r, MIMO detector 256, RX processor, etc.

The master UE 304 optionally includes a control signaling module 1322, which may correspond to processor circuitry in UE 120 as depicted in FIG. 2, including controller/processor 280 and memory 282. The master UE 304 further includes a cellular communications interface 1326 (e.g., 5G NR, etc.), which may comprise transmitter and receiver circuitry in UE 120 as depicted in FIG. 2, including controller/processor 280, antenna(s) 252a . . . 252r, modulators(s) 254a . . . 254r, TX MIMO processor 266, TX processor 264, demodulators(s) 254a . . . 254r, MIMO detector 256, RX processor, etc. The master UE 304 further includes a D2D communications interface 1326 (e.g., Bluetooth, etc.), which may comprise transmitter and receiver circuitry in UE 120 as depicted in FIG. 2, including controller/processor 280, antenna(s) 252a . . . 252r, modulators(s) 254a . . . 254r, TX MIMO processor 266, TX processor 264, demodulators(s) 254a . . . 254r, MIMO detector 256, RX processor, etc.

The RAN 306 includes a wireless interface 1332 (e.g., 5G NR, etc.) and a backhaul interface 1334 (e.g., for communicating with the core network 308 and/or other network components). The core network 308 comprises a backhaul interface 1342 (e.g., for communicating with the RAN 306 and/or other network components). The core network 308 comprises a communications interface 1344 (e.g., for communicating with nodes outside of the cellular network infrastructure, such as the application server 310 which is reachable via an Internet connection). The application server 310 comprises a communications interface 1352 and an application-layer module 1354 (e.g., for providing various services to clients, such as the slave UE 302 or the master UE 304.

Referring to FIG. 13, when the slave UE 302 is not tethered to the master UE 304, the slave UE 302 may communicate directly with the wireless interface 1332 of the RAN 306 via the cellular communications interface 1306. When tethered to the master UE 304, the slave UE 302 may instead route some of its cellular traffic to the master UE 304 via the D2D communications interfaces 1308 and 1326, which in turn routes the slave UE's cellular traffic to the RAN 306 via the cellular communications interface 1324. Control plane signaling can be handled (e.g., generation, processing, encryption and decryption) either at control signaling module 1304 or the control signaling module 1322). The various UE-to-network control plane signaling may in turn be used to support end-to-end data plane traffic (or application-layer traffic) being exchanged between the application-layer module 1302 and the application-layer module 1354.

One or more components of the apparatuses 302 and 304 in FIG. 13 may perform each of the blocks of the algorithm in the aforementioned flowcharts of FIGS. 4-5, 7-9 and 11-12. As such, each block in the aforementioned flowcharts of FIGS. 4-5, 7-9 and 11-12 may be performed by component(s) of the slave UE 302 or the master UE 304. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
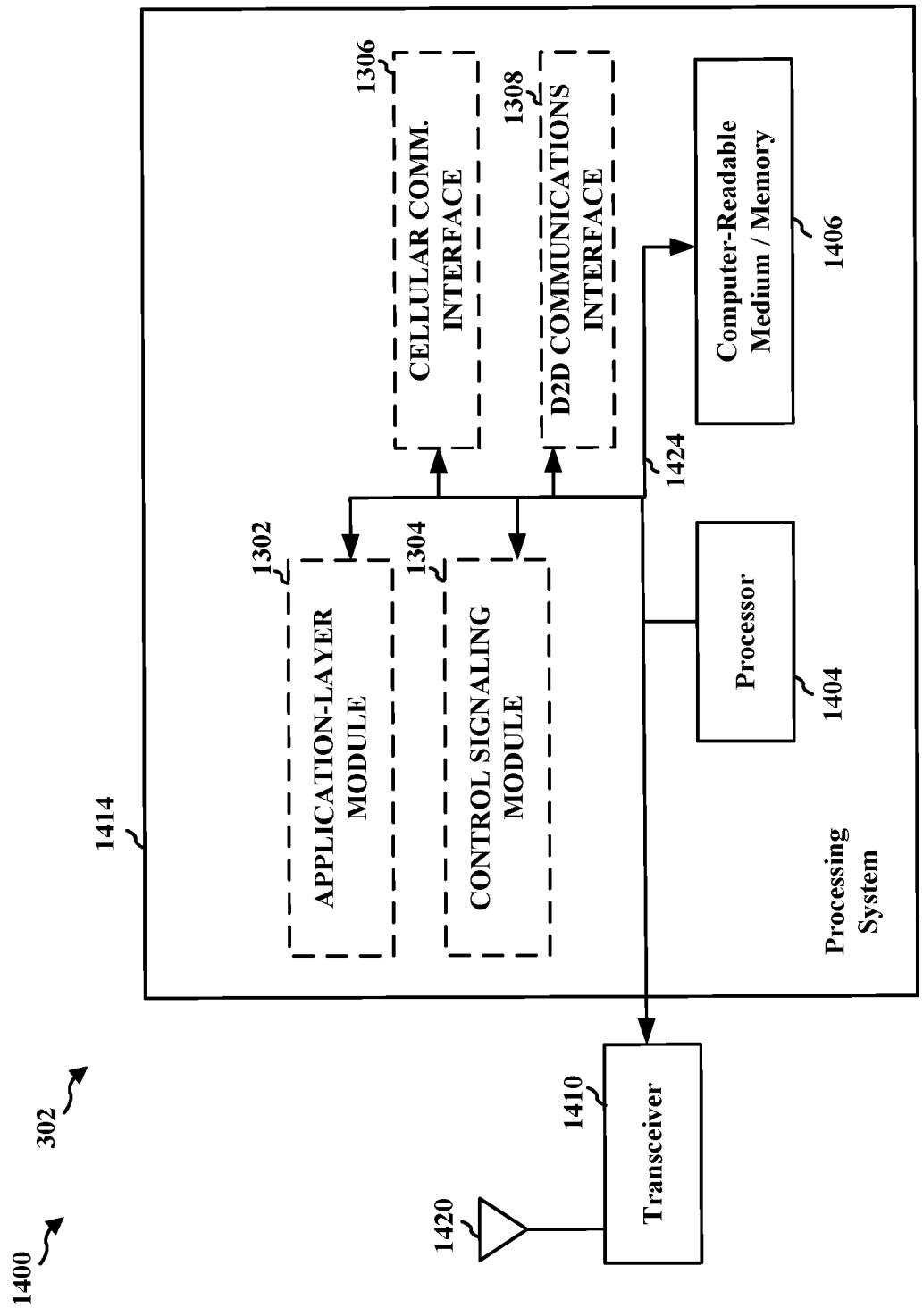
FIG. 14 is a diagram illustrating an example of a hardware implementation for an apparatus employing a processing system according to an aspect of the disclosure.

FIG. 14 is a diagram 1400 illustrating an example of a hardware implementation for the slave UE 302 employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1302, 1304, 1306 and 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the cellular communications interface 1306 or the D2D communications interface 1308. In addition, the transceiver 1410 receives information from the processing system 1414, specifically the cellular communications interface 1306 or the D2D communications interface 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1302 or 1304. The components may be software components running in the processor 1404, resident/stored in the computer readable medium/memory 1406, one or more hardware components coupled to the processor 1404, or some combination thereof. The processing system 1414 may be a component of the UE 120 of FIG. 2 and may include the memory 282, and/or at least one of the TX processor 264, the RX processor 258, and the controller/processor 280.

In one configuration, the slave UE 302 includes means for establishing an attachment to a core network of a cellular communications system, means for obtaining a set of security credentials configured to encrypt and decrypt traffic between the slave UE and the core network, means for establishing a device-to-device (D2D) connection with a master UE that is also attached to the core network, means for offloading, from the slave UE to the master UE, one or more communication functions with the core network including at least one communication function for maintaining the attachment of the slave UE to the core network, the one or more offloaded communication functions including transport of control plane signaling associated with the slave UE's set of security credentials, and means for exchanging application-layer data that is relayed by the master UE over the D2D connection and is targeted to or received from an application server. In some designs, the slave UE 302 further includes means for continuing to perform by the slave UE at least one non-offloaded communication function (e.g., including one or more functions that are required to maintain the attachment of the slave UE to the core network) after the offloading. In some designs, the slave UE 302 further includes means for determining to resume performance of the one or more offloaded communication functions, and means for receiving information, in response to the determination, from the master UE over the D2D connection to facilitate the resumption of the one or more offloaded communication functions, and means for transmitting, by the slave UE to the core network, a message reporting the capability information for the slave UE. In some designs, the slave UE 302 further includes means for receiving, over the D2D connection from the master UE, a message from the master UE that requests the slave UE to generate a control message, means for generating the control message in response to the received message, and means for transmitting, over the D2D connection to the master UE, the control message to the master UE over the D2D connection for transmission to the core network. In some designs, the slave UE 302 further includes means for determining to resume performance of the one or more offloaded communication functions, and means for receiving information, in response to the determination, from the master UE over the D2D connection to facilitate the resumption of the one or more offloaded communication functions. The aforementioned means may be one or more of the aforementioned components of the slave UE 302 and/or the processing system 1414 of the slave UE 302 configured to perform the functions recited by the aforementioned means. As described supra, the processing system 1414 may include the TX processor 264, the RX processor 258, and the controller/processor 280.

Figure 15:
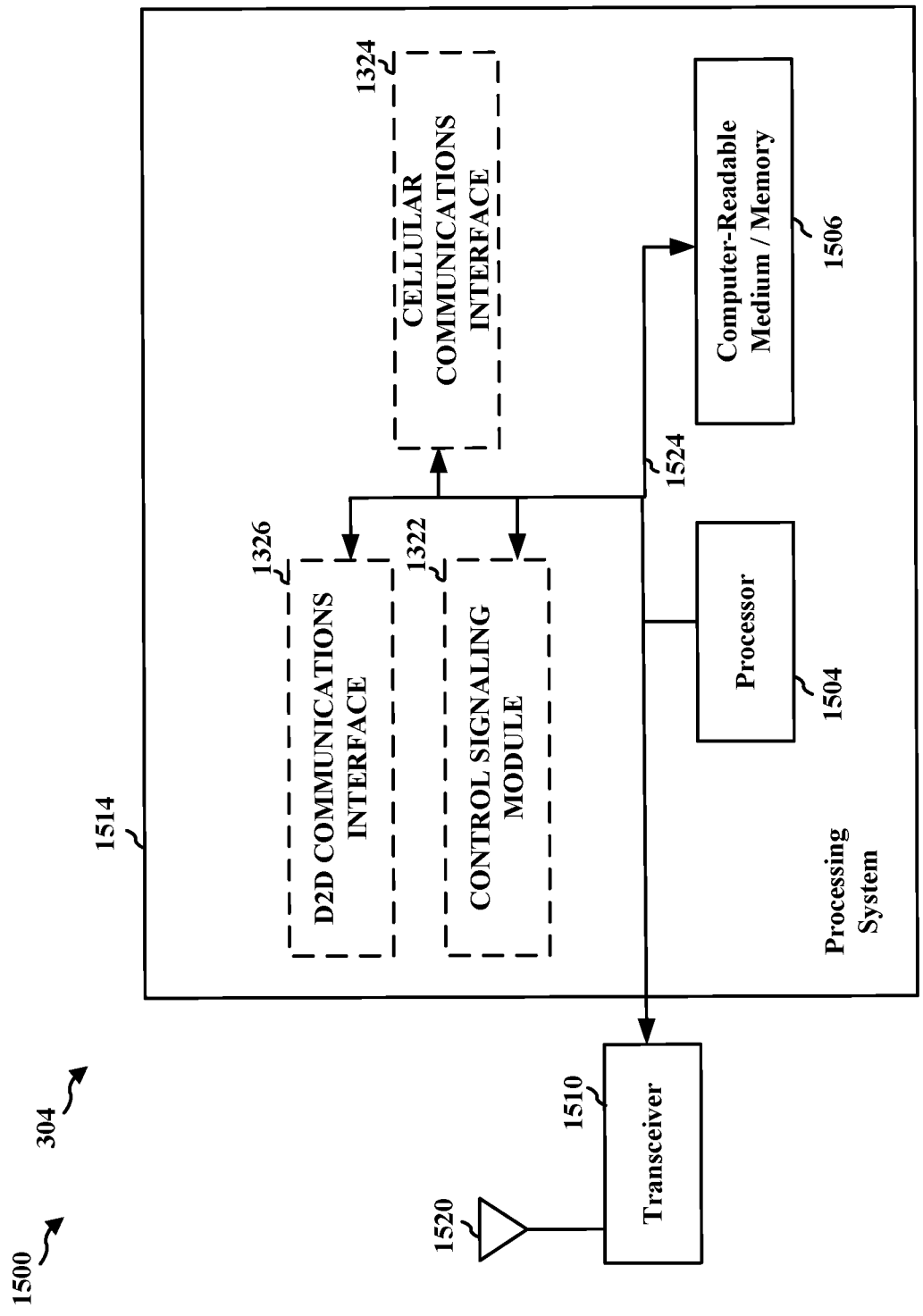
FIG. 15 is a diagram illustrating an example of a hardware implementation for an apparatus employing a processing system according to another aspect of the disclosure.

FIG. 15 is a diagram 1500 illustrating an example of a hardware implementation for the master UE 304 employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1322, 1324 and 1326, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the cellular communications interface 1324 or the D2D communications interface 1326. In addition, the transceiver 1510 receives information from the processing system 1514, specifically the cellular communications interface 1324 or the D2D communications interface 1326, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least the component 1322. The components may be software components running in the processor 1504, resident/stored in the computer readable medium/memory 1506, one or more hardware components coupled to the processor 1504, or some combination thereof. The processing system 1514 may be a component of the UE 120 of FIG. 2 and may include the memory 282, and/or at least one of the TX processor 264, the RX processor 258, and the controller/processor 280.

In one configuration, the master UE 304 includes means for establishing an attachment to a core network of a cellular communications system, means for establishing a device-to-device (D2D) connection with a slave UE that is also attached to the core network, means for offloading, from the slave UE to the master UE, one or more communication functions with the core network including at least one communication function for maintaining the attachment of the slave UE to the core network, means for performing the one or more offloaded communication functions on behalf of the slave UE, the one or more offloaded communication functions including transport of control plane signaling associated with a set of security credentials assigned to the slave UE, and means for relaying application-layer data between an application server and the slave UE via the D2D connection. In some designs, the master UE 304 further includes means for transmitting, over the D2D connection to the slave UE, a message that requests the slave UE to generate a control message, means for receiving, over the D2D connection from the slave UE, the control message, and means for transmitting the control message to the core network. In some designs, the master UE 304 further includes means for determining that the slave UE is to resume performance of the one or more offloaded communication functions, and means for transmitting, over the D2D connection to the slave UE in response to the determination, information to facilitate the resumption of the one or more offloaded communication functions. The aforementioned means may be one or more of the aforementioned components of the slave UE 302 and/or the processing system 1414 of the slave UE 302 configured to perform the functions recited by the aforementioned means. As described supra, the processing system 1414 may include the TX processor 264, the RX processor 258, and the controller/processor 280.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a slave user equipment (UE), comprising:
    establishing an attachment to a core network of a cellular communications system;
    obtaining a set of security credentials configured to encrypt and decrypt traffic between the slave UE and the core network;
    establishing a device-to-device (D2D) connection with a master UE that is also attached to the core network;
    offloading, from the slave UE to the master UE, one or more communication functions including at least one communication function with the core network for maintaining the attachment of the slave UE to the core network, the one or more offloaded communication functions including transport of control plane signaling associated with the slave UE's set of security credentials; and
    exchanging application-layer data that is relayed by the master UE over the D2D connection and is targeted to or received from an application server.

2. The method of claim 1, further comprising:
    continuing to perform by the slave UE at least one non-offloaded communication function after the offloading.

3. The method of claim 2,
    wherein the one or more offloaded communication functions include transport of data plane traffic with the core network and transport of the control plane signaling with the core network,
    wherein the at least one non-offloaded communication function includes generation and processing of the data plane traffic, and generation, processing, encryption and decryption of the control plane signaling using the slave UE's set of security credentials, and
    wherein the control plane signaling is communicated between the slave UE and the master UE over the D2D connection.

4. The method of claim 3, wherein the offloading comprises:
    receiving, over the D2D connection from the master UE, an indication of capability information for the master UE; and
    transmitting, over the D2D connection for transmission by the master UE to the core network, a message reporting the capability information for the master UE as capability information for the slave UE.

5. The method of claim 4, further comprising:
    determining to resume performance of the one or more offloaded communication functions;
    in response to the determining:
        receiving information from the master UE over the D2D connection to facilitate the resumption of the one or more offloaded communication functions; and
        transmitting, by the slave UE to the core network, a message reporting the capability information for the slave UE.

6. The method of claim 3, further comprising:
    receiving, over the D2D connection from the master UE, a message from the master UE that requests the slave UE to generate a control message;
    generating the control message in response to the received message; and
    transmitting, over the D2D connection to the master UE, the control message to the master UE over the D2D connection for transmission to the core network.

7. The method of claim 6,
    wherein the control message is a control plane registration update message, or
    wherein the control message is a tracking area update (TAU) message.

8. The method of claim 1, wherein the control plane signaling includes non-access stratum (NAS)/access stratum (AS) signaling.

9. The method of claim 1, wherein the one or more offloaded communication functions include both (i) transport of data plane traffic with the core network and transport of the control plane signaling with the core network, and (ii) generation, processing, encryption and decryption of the control plane signaling using the slave UE's set of security credentials without involvement of the slave UE.

10. The method of claim 9, wherein the offloading includes:
    transmitting, over the D2D connection to the master UE, the slave UE's set of security credentials to facilitate the master UE to perform the encryption and decryption of the control plane signaling using the slave UE's set of security credentials without involvement of the slave UE.

11. The method of claim 1, wherein the one or more offloaded communication functions include a page monitoring function and transmission of mobile-originated service requests.

12. The method of claim 1, wherein the one or more offloaded communication functions include radio resource management (RRM) and mobility management.

13. The method of claim 1, further comprising:
    determining to resume performance of the one or more offloaded communication functions;
    in response to the determining, receiving information from the master UE over the D2D connection to facilitate the resumption of the one or more offloaded communication functions.

14. The method of claim 1, wherein the application-layer data is transported through the core network using a data forwarding address set to an Internet Protocol (IP) address associated with the slave UE after the offloading.

15. A method of operating a master user equipment (UE), comprising:

establishing an attachment to a core network of a cellular communications system;

establishing a device-to-device (D2D) connection with a slave UE that is also attached to the core network;

offloading, from the slave UE to the master UE, one or more communication functions including at least one communication function with the core network for maintaining the attachment of the slave UE to the core network;

performing the one or more offloaded communication functions on behalf of the slave UE, the one or more offloaded communication functions including transport of control plane signaling associated with a set of security credentials assigned to the slave UE; and relaying application-layer data between an application server and the slave UE via the D2D connection.

16. The method of claim 15, wherein the one or more offloaded communication functions excludes at least one non-offloaded communication function that continues to be performed by the slave UE during the performing.

17. The method of claim 16,
wherein the one or more offloaded communication functions include transport of data plane traffic with the core network and transport of the control plane signaling with the core network,
wherein the at least one non-offloaded communication function includes generation and processing of the data plane traffic, and generation, processing, encryption and decryption of the control plane signaling using the slave UE's set of security credentials, and
wherein the control plane signaling is communicated between the slave UE and the master UE over the D2D connection.

18. The method of claim 17, wherein the offloading comprises:
transmitting, over the D2D connection to the slave UE, an indication of capability information for the master UE;
receiving, over the D2D connection from the slave UE, a message reporting the capability information for the master UE as capability information for the slave UE; and
transmitting the message to the core network.

19. The method of claim 17, further comprising:
transmitting, over the D2D connection to the slave UE, a message that requests the slave UE to generate a control message;
receiving, over the D2D connection from the slave UE, the control message; and
transmitting the control message to the core network.

20. The method of claim 19,
wherein the control message is a control plane registration update message, or
wherein the control message is a tracking area update (TAU) message.

21. The method of claim 15, wherein the control plane signaling includes non-access stratum (NAS)/access stratum (AS) signaling.

22. The method of claim 15, wherein the one or more offloaded communication functions include both (i) transport of data plane traffic with the core network and transport of the control plane signaling with the core network, and (ii) generation, processing, encryption and decryption of the control plane signaling using the slave UE's set of security credentials without involvement of the slave UE.

23. The method of claim 22, wherein the offloading includes:

receiving, over the D2D connection from the slave UE, the slave UE's set of security credentials,
wherein the performing performs the generation, processing, encryption and decryption of the control plane signaling using the slave UE's set of security credentials without involvement of the slave UE.

24. The method of claim 15, wherein the one or more offloaded communication functions include a page monitoring function and transmission of mobile-originated service requests.

25. The method of claim 15, wherein the one or more offloaded communication functions include radio resource management (RRM) and mobility management.

26. The method of claim 15, further comprising:
determining that the slave UE is to resume performance of the one or more offloaded communication functions;
in response to the determining, transmitting, over the D2D connection to the slave UE, information to facilitate the resumption of the one or more offloaded communication functions.

27. The method of claim 15, wherein the application-layer data is transported through the core network using a data forwarding address set to an Internet Protocol (IP) address associated with the slave UE during the performing.

28. A slave user equipment (UE), comprising:
a memory; and
at least one processor coupled to the memory and configured to:
establish an attachment to a core network of a cellular communications system;
obtain a set of security credentials configured to encrypt and decrypt traffic between the slave UE and the core network;
establish a device-to-device (D2D) connection with a master UE that is also attached to the core network;
offload, from the slave UE to the master UE, one or more communication functions including at least one communication function with the core network for maintaining the attachment of the slave UE to the core network, the one or more offloaded communication functions including transport of control plane signaling associated with the slave UE's set of security credentials; and
exchange application-layer data that is relayed by the master UE over the D2D connection and is targeted to or received from an application server.

29. The slave UE of claim 28,
wherein the one or more offloaded communication functions include a page monitoring function and transmission of mobile-originated service requests, or
wherein the one or more offloaded communication functions include radio resource management (RRM) and mobility management, or
a combination thereof.

30. A master user equipment (UE), comprising:
a memory; and
at least one processor coupled to the memory and configured to:
establish an attachment to a core network of a cellular communications system;
establish a device-to-device (D2D) connection with a slave UE that is also attached to the core network;
offload, from the slave UE to the master UE, one or more communication functions including at least one communication function with the core network for maintaining the attachment of the slave UE to the core network;

perform the one or more offloaded communication functions on behalf of the slave UE, the one or more offloaded communication functions including transport of control plane signaling associated with a set of security credentials assigned to the slave UE; and
relay application-layer data between an application server and the slave UE via the D2D connection.

* * * * *